(12) United States Patent
Ohmura et al.

(10) Patent No.: US 10,863,086 B2
(45) Date of Patent: *Dec. 8, 2020

(54) COMMUNICATION TERMINAL, IMAGE COMMUNICATION SYSTEM, DISPLAY CONTROL METHOD, AND NON-TRANSITORY COMPUTER-READABLE MEDIUM

(71) Applicant: Ricoh Company, Ltd., Tokyo (JP)

(72) Inventors: Yohhei Ohmura, Kanagawa (JP); Kenichiro Morita, Tokyo (JP); Takeshi Homma, Kanagawa (JP); Takuya Soneda, Kanagawa (JP); Mayu Hakata, Kanagawa (JP); Hidekuni Annaka, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,782

(22) Filed: Oct. 9, 2019

(65) Prior Publication Data

US 2020/0045230 A1 Feb. 6, 2020

Related U.S. Application Data

(63) Continuation of application No. 16/140,945, filed on Sep. 25, 2018, now Pat. No. 10,484,603.

(30) Foreign Application Priority Data

Sep. 25, 2017 (JP) .................. 2017-183742
Sep. 21, 2018 (JP) .................. 2018-177017

(51) Int. Cl.
*H04N 5/232* (2006.01)
*H04N 7/14* (2006.01)
*H04N 7/15* (2006.01)

(52) U.S. Cl.
CPC ......... *H04N 5/23238* (2013.01); *H04N 7/142* (2013.01); *H04N 7/147* (2013.01); *H04N 7/15* (2013.01); *H04N 7/155* (2013.01)

(58) Field of Classification Search
CPC ............. H04N 5/23238; H04N 5/2723; H04N 5/44504; H04N 5/272; H04N 3/23238;
(Continued)

(56) References Cited

U.S. PATENT DOCUMENTS 8,773,475 B2 7/2014 Ishida et al.
9,207,754 B2 * 12/2015 Bennett ................ G06F 16/951
(Continued)

FOREIGN PATENT DOCUMENTS

JP 2003-132362 A 5/2003
JP 2011-223076 A 11/2011
(Continued)

OTHER PUBLICATIONS

Extended European Search Report dated Feb. 26, 2019 in corresponding European Patent Application No. 18196289.5, 12 pages.

*Primary Examiner* — Binh Kien Tieu
(74) *Attorney, Agent, or Firm* — Xsensus LLP

(57) ABSTRACT

A communication terminal for displaying a predetermined-area image, which is an image of a part of a whole image, includes circuitry. The circuitry receives first predetermined information specifying a first predetermined area, the first predetermined information being transmitted from another communication terminal displaying a first predetermined-area image, which is an image of the first predetermined-area. The circuitry calculates a position of the first predetermined area with respect to a second predetermined area, based on the first predetermined information received and second predetermined information specifying the second predetermined area, the second predetermined area being an
(Continued)

area of a second predetermined-area image being displayed by the communication terminal. The circuitry controls a display to display the second predetermined-area image including at least one of relative position information indicating the position calculated and direction information indicating a direction of the first predetermined area with respect to the second predetermined area.

6 Claims, 33 Drawing Sheets

(58) Field of Classification Search
CPC .... H04N 5/05; H04N 7/0127; H04N 5/23229; H04N 5/23293; H04N 13/275; H04N 13/156; H04N 21/41407; H04N 21/234; H04N 27/2743; G06K 9/00624; G06K 9/00664; G06T 3/0062; G06T 5/50; G06T 2200/24; G06T 19/003; G06T 3/4038; H04L 67/24; H04L 63/083; H06F 17/212; H06F 3/04845
USPC ......... 348/14.01, 14.02, 14.05, 14.07, 14.08, 348/14.09, 14.12, 14.16
See application file for complete search history.

(56) References Cited

U.S. PATENT DOCUMENTS

| | | | |
|---|---|---|---|
| 10,038,841 B1 | 7/2018 | Davey | |
| 10,484,603 B2* | 11/2019 | Ohmura | H04N 7/142 |
| 10,536,668 B2* | 1/2020 | Soneda | H04N 7/147 |
| 2002/0147991 A1 | 10/2002 | Furlan et al. | |
| 2004/0223191 A1* | 11/2004 | Murata | H04N 5/232 |
| | | | 358/451 |
| 2009/0207246 A1 | 8/2009 | Inami et al. | |
| 2010/0045773 A1* | 2/2010 | Ritchey | H04N 5/2259 |
| | | | 348/36 |
| 2011/0234640 A1 | 9/2011 | Ishida | |
| 2014/0063181 A1 | 3/2014 | Lee et al. | |
| 2016/0241631 A1 | 8/2016 | Tamura | |
| 2017/0054907 A1 | 2/2017 | Nishihara et al. | |
| 2017/0091899 A1 | 3/2017 | Mitsui et al. | |
| 2017/0223268 A1 | 8/2017 | Shimmoto | |
| 2017/0244945 A1 | 8/2017 | Matias et al. | |
| 2017/0257576 A1 | 9/2017 | Mitsui et al. | |
| 2018/0097682 A1 | 4/2018 | Yoshida et al. | |
| 2018/0098105 A1 | 4/2018 | Morita et al. | |
| 2018/0124310 A1 | 5/2018 | Taneichi et al. | |
| 2018/0139361 A1 | 5/2018 | Ogawara et al. | |
| 2018/0173679 A1 | 6/2018 | Ogawara et al. | |
| 2018/0182065 A1 | 6/2018 | Yoshida et al. | |
| 2018/0191787 A1 | 7/2018 | Morita et al. | |
| 2018/0227457 A1 | 8/2018 | Morita et al. | |
| 2018/0270417 A1 | 9/2018 | Suitoh et al. | |
| 2018/0359430 A1 | 12/2018 | Sasaki et al. | |
| 2018/0376130 A1 | 12/2018 | Takematsu et al. | |
| 2019/0020644 A1 | 1/2019 | Asai | |
| 2019/0020654 A1 | 1/2019 | Asai | |
| 2019/0020655 A1 | 1/2019 | Asai | |
| 2019/0028558 A1 | 1/2019 | Asai | |
| 2019/0028642 A1 | 1/2019 | Fujita et al. | |
| 2019/0082144 A1 | 3/2019 | Hakata et al. | |
| 2020/0007764 A1* | 1/2020 | Han | G06F 3/0412 |

FOREIGN PATENT DOCUMENTS

| | | |
|---|---|---|
| JP | 2012-178135 A | 9/2012 |
| WO | 2017/160539 A1 | 9/2017 |

* cited by examiner

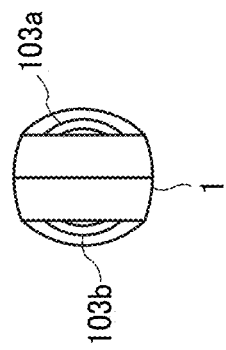
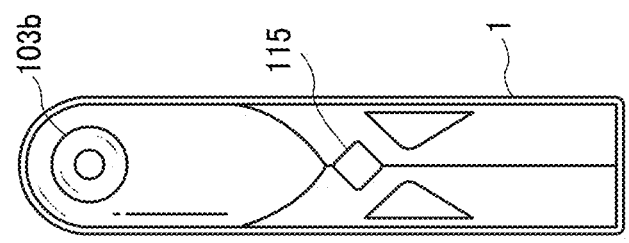
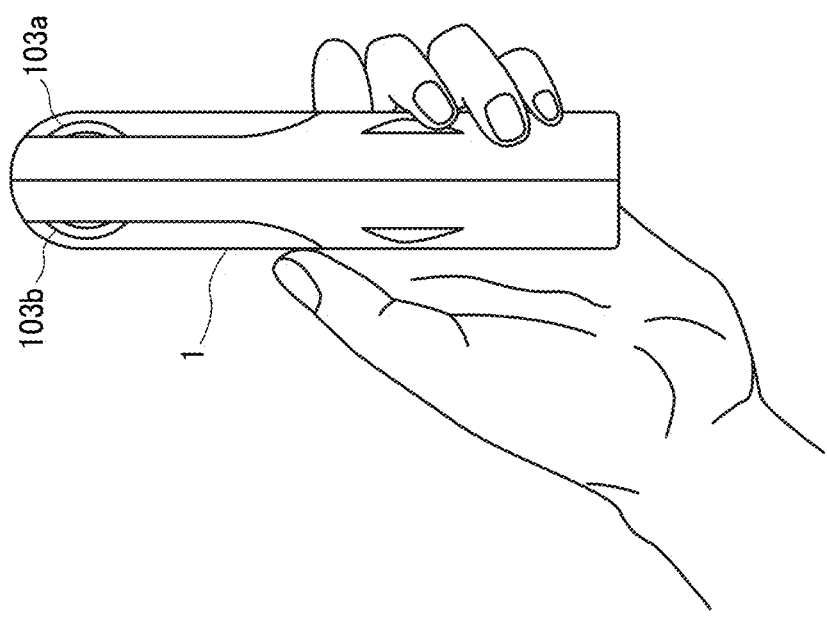

FIG. 3A
FIG. 3B
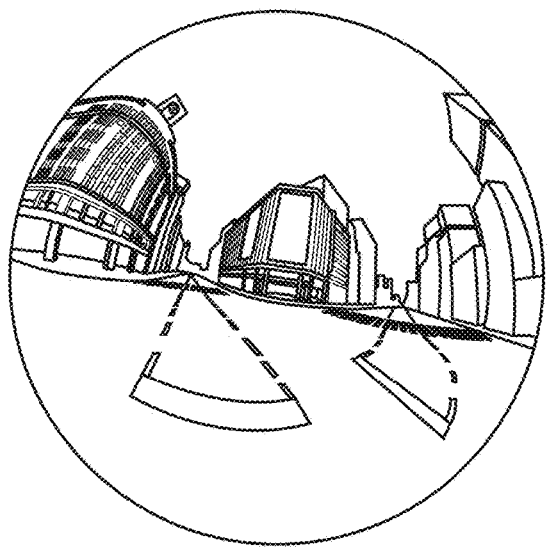
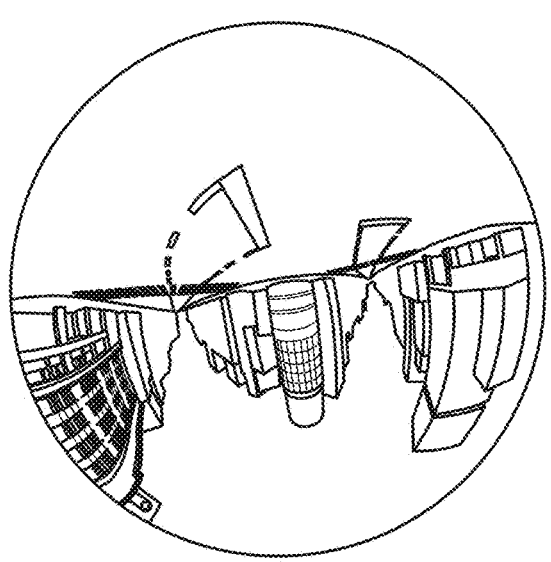
FIG. 3C
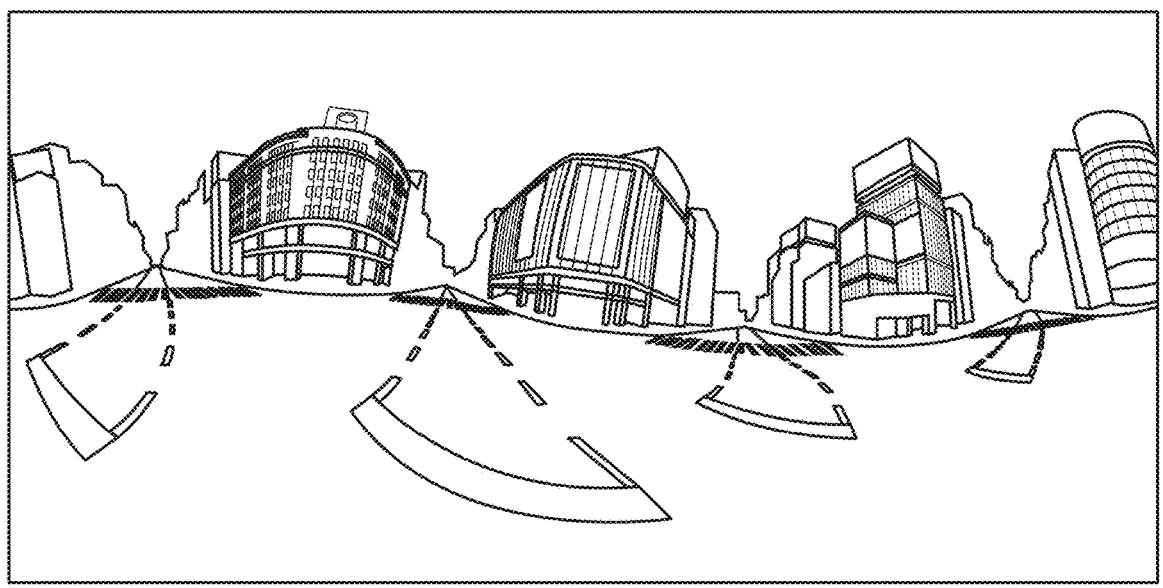

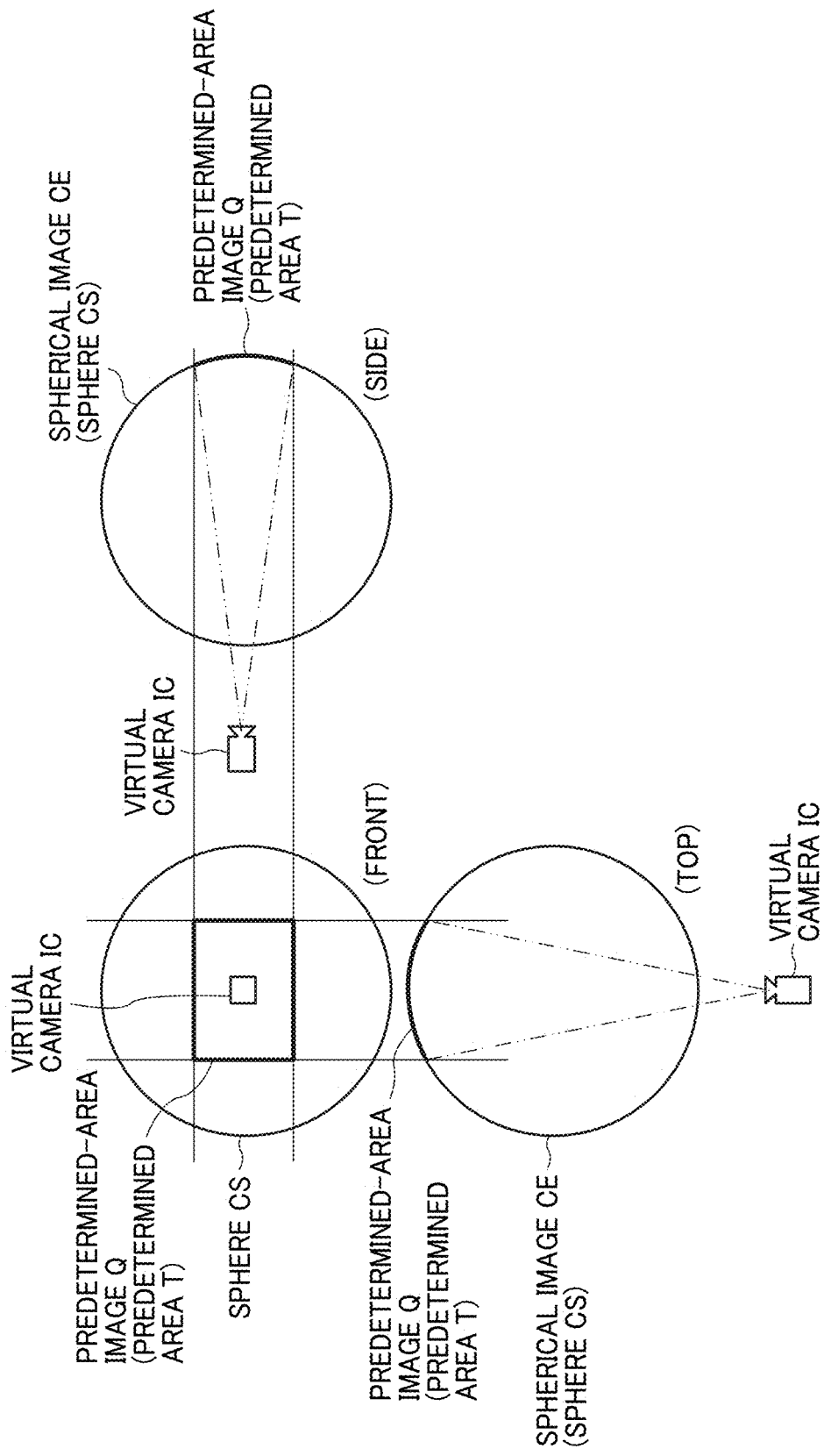

VIRTUAL CAMERA IC
SPHERE CS
PREDETERMINED-AREA IMAGE Q (PREDETERMINED AREA T)

PREDETERMINED AREA T
CENTER POINT CP
DIAGONAL LINE 2L
DISTANCE f
VIRTUAL CAMERA IC

FIG. 16

IMAGE TYPE MANAGEMENT TABLE

| IMAGE DATA ID | IP ADDRESS OF SENDER TERMINAL | SOURCE NAME (IMAGE TYPE INFORMATION) |
|---|---|---|
| RS001 | 1.2.1.3 | Video_Theta |
| RS002 | 1.2.2.3 | Video_Theta |
| RS003 | 1.3.1.3 | Video |
| RS004 | 1.3.2.3 | Video |

FIG. 17

IMAGE CAPTURING DEVICE MANAGEMENT TABLE

| VENDER ID AND PRODUCT ID OF GUID OF IMAGE CAPTURING DEVICE |
|---|
| vid_05ca&pid_2711 |
| vid_05ca&pid_3822 |
| ... |

FIG. 18

PREDETERMINED-AREA MANAGEMENT TABLE

| IP ADDRESS OF SENDER TERMINAL THAT SENDS IMAGE DATA | IP ADDRESS OF DESTINATION TERMINAL THAT RECEIVES IMAGE DATA (IP ADDRESS OF SENDER TERMINAL THAT SENDS PREDETERMINED-AREA INFORMATION) | PREDETERMINED-AREA INFORMATION | | |
|---|---|---|---|---|
| | | MOVING RADIUS ($r$) | POLAR ANGLE ($\theta$) | AZIMUTH ($\phi$) |
| 1.2.1.3 | 1.2.2.3 | 10 | 20 | 30 |
| 1.2.1.3 | 1.3.1.3 | 20 | 30 | 40 |
| 1.2.1.3 | 1.3.2.3 | 30 | 40 | 50 |
| 1.2.2.3 | 1.2.1.3 | ... | ... | ... |
| 1.2.2.3 | 1.3.1.3 | ... | ... | ... |
| 1.2.2.3 | 1.3.2.3 | ... | ... | ... |

FIG. 19

SESSION MANAGEMENT TABLE

| SESSION ID | IP ADDRESS OF PARTICIPANT TERMINAL |
|---|---|
| se101 | 1.2.1.3, 1.2.2.3, 1.3.1.3 |
| se102 | 1.2.1.3, 1.2.2.3, 1.3.1.3 |
| ... | ... |

FIG. 20

IMAGE TYPE MANAGEMENT TABLE

| SESSION ID | IMAGE DATA ID | IP ADDRESS OF SENDER TERMINAL | SOURCE NAME (IMAGE TYPE INFORMATION) |
|---|---|---|---|
| se101 | RS001 | 1.2.1.3 | Video_Theta |
| se101 | RS002 | 1.2.2.3 | Video |
| se101 | RS003 | 1.3.1.3 | Video_Theta |
| se102 | RS004 | 1.2.1.4 | Video |
| se102 | RS005 | 1.3.1.4 | Video_Theta |
| ... | ... | ... | ... |

FIG. 21

PREDETERMINED-AREA MANAGEMENT TABLE

| IP ADDRESS OF SENDER TERMINAL THAT SENDS IMAGE DATA | IP ADDRESS OF DESTINATION TERMINAL THAT RECEIVES IMAGE DATA | PREDETERMINED-AREA INFORMATION | | |
|---|---|---|---|---|
| | | MOVING RADIUS (r) | POLAR ANGLE ($\theta$) | AZIMUTH ($\phi$) |
| 1.2.1.3 | 1.2.2.3 | 10 | 20 | 30 |
| 1.2.1.3 | 1.2.2.3 | 20 | 30 | 40 |
| 1.2.1.3 | 1.2.2.3 | ... | ... | ... |
| 1.2.2.3 | 1.2.1.3 | ... | ... | ... |
| 1.2.2.3 | 1.2.1.3 | ... | ... | ... |
| ... | ... | | | |

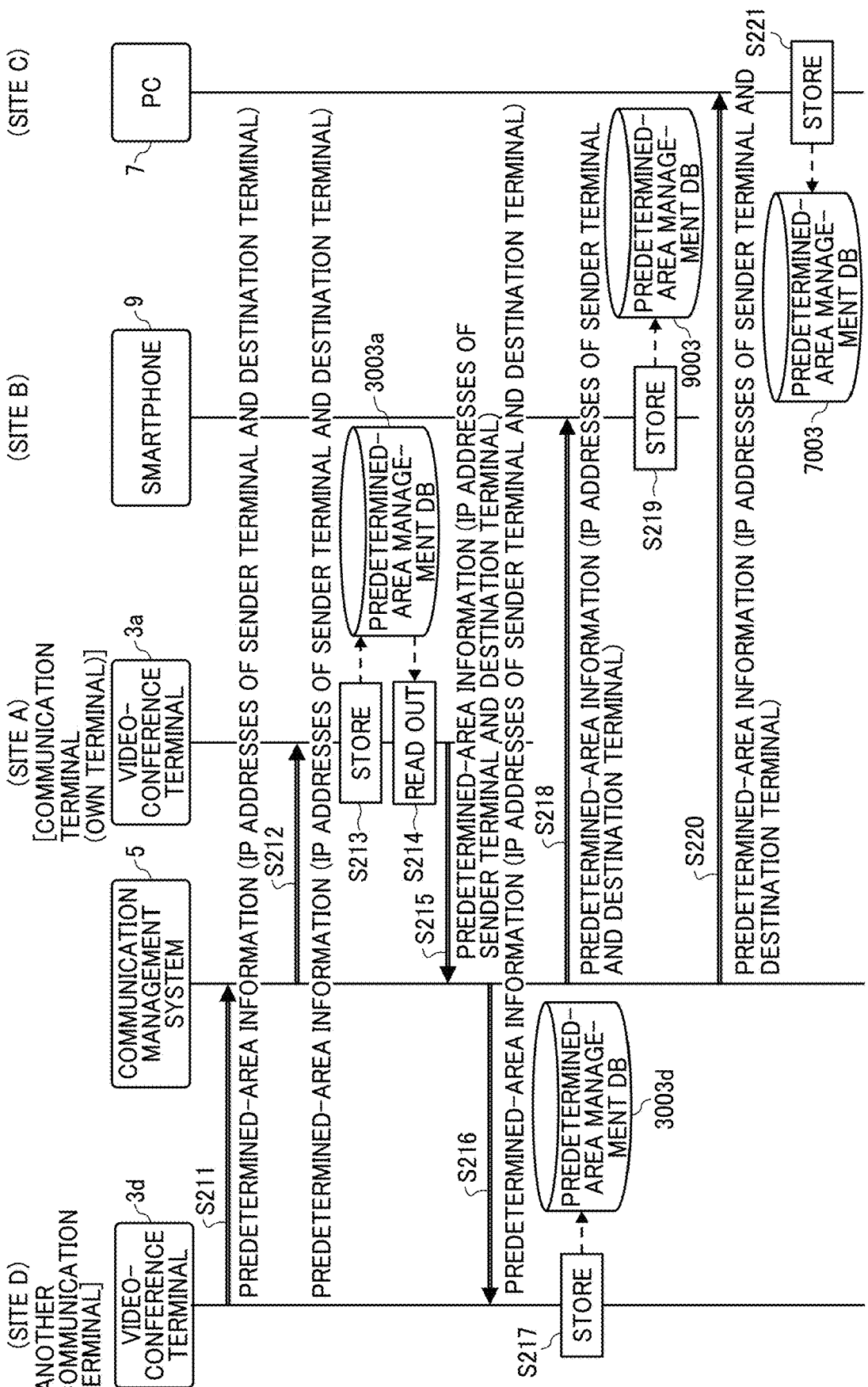

US 10,863,086 B2

COMMUNICATION TERMINAL, IMAGE COMMUNICATION SYSTEM, DISPLAY CONTROL METHOD, AND NON-TRANSITORY COMPUTER-READABLE MEDIUM

CROSS-REFERENCE TO RELATED APPLICATIONS

This patent application is a continuation of U.S. application Ser. No. 16/140,945, filed Sep. 25, 2018, which is based on and claims priority pursuant to 35 U.S.C. § 119(a) to Japanese Patent Application Nos. 2017-183742, filed on Sep. 25, 2017 and 2018-177017, filed on Sep. 21, 2018, the entire disclosures of each are hereby incorporated by reference herein.

BACKGROUND

Technical Field

The present disclosure relates to a communication terminal, an image communication system, a display control method, and a non-transitory computer-readable medium.

Description of the Related Art

Videoconference systems are now in widespread use, allowing users at remote places to hold a remote conference via a communication network such as the Internet. In such videoconference systems, a communication terminal for a videoconference system is provided in a meeting room where attendants of one party in a remote conference are attending. This communication terminal collects an image or video of the meeting room including the attendants and sound such as speech made by the attendants, and transmits digital data converted from the collected image (video) and/or sound to the other party's communication terminal provided at a different meeting room. Based on the transmitted digital data, the other party's communication terminal displays images on a display or outputs audio from a speaker in the different meeting room to establish video calling. This enables to carry out a conference among remote sites, in a state close to an actual conference.

Additionally, a communication terminal is known that is connected to an image capturing device that can capture a spherical panoramic image in real time and transmits a spherical panoramic image acquired by the image capturing device to each communication terminal of the other party. The communication terminal of the other party displays, on a display, a predetermined-area image representing an image of a predetermined area, which is a part of the spherical panoramic image. A user in each of remote sites can determine, by his or her own, a predetermined-area image to be displayed, representing an image of a predetermined area that the user is interested in, from a whole image of the spherical panoramic image.

SUMMARY

A communication terminal for displaying a predetermined-area image, which is an image of a part of a whole image, includes circuitry. The circuitry receives first predetermined information specifying a first predetermined area, the first predetermined information being transmitted from another communication terminal displaying a first predetermined-area image, which is an image of the first predetermined-area in the whole image. The circuitry calculates a position of the first predetermined area with respect to a second predetermined area in the whole image, based on the first predetermined information received and second predetermined information specifying the second predetermined area, the second predetermined area being an area of a second predetermined-area image being displayed by the communication terminal. The circuitry controls a display to display, based on the position calculated, the second predetermined-area image including at least one of relative position information indicating the position calculated and direction information indicating a direction of the first predetermined area with respect to the second predetermined area.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 1A is a left side view of an image capturing device according to an embodiment of the present disclosure;

FIG. 1B is a front view of the image capturing device of FIG. 1A;

FIG. 1C is a plan view of the image capturing device of FIG. 1A;

FIG. 3A is an illustration of a front side of a hemispherical image captured by the image capturing device according to an embodiment of the present disclosure;

FIG. 3B is an illustration of a back side of the hemispherical image captured by the image capturing device according to an embodiment of the present disclosure;

FIG. 3C is an illustration of an image captured by the image capturing device represented by Mercator projection, according to an embodiment of the present disclosure;

FIG. 5 is an illustration of relative positions of a virtual camera and a predetermined area in a case where the spherical panoramic image is represented as a three-dimensional solid sphere, according to an embodiment of the present disclosure;

FIG. 16 is a conceptual diagram illustrating an image type management table, according to an embodiment of the present disclosure;

FIG. 17 is a conceptual diagram illustrating an image capturing device management table, according to an embodiment of the present disclosure;

FIG. 18 is a conceptual diagram illustrating a predetermined-area management table, according to an embodiment of the present disclosure;

FIG. 19 is a conceptual diagram illustrating a session management table, according to an embodiment of the present disclosure;

FIG. 20 is a conceptual diagram illustrating an image type management table, according to an embodiment of the present disclosure;

FIG. 21 is a conceptual diagram illustrating a predetermined-area management table, according to an embodiment of the present disclosure;

FIG. 35 is a sequence diagram illustrating another operation of sharing the predetermined-area information, according to an embodiment of the present disclosure.

Figure 2:
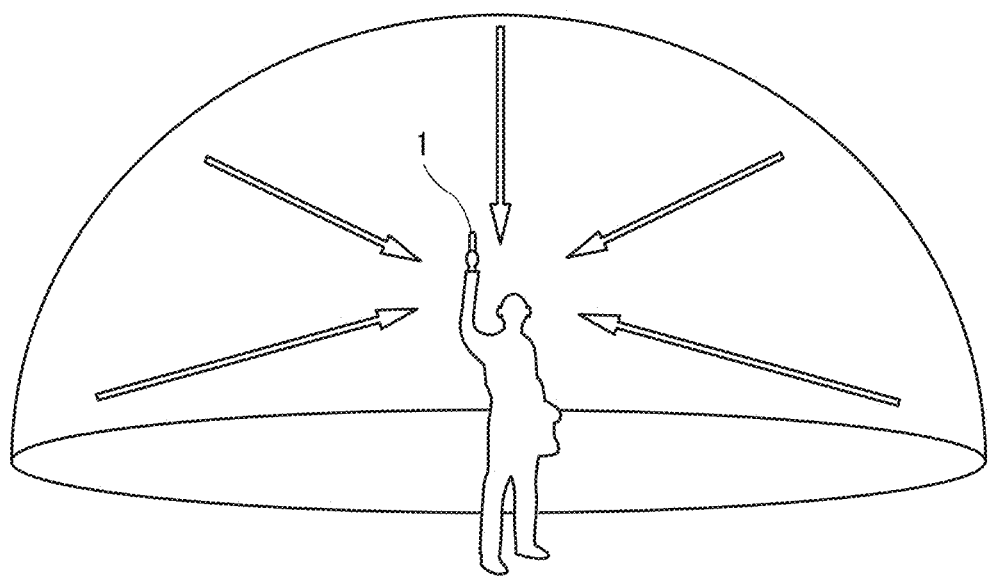
FIG. 2 is an illustration of how a user uses the image capturing device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of an embodiment of the present disclosure, with reference to drawings.

First Embodiment

First, referring to FIGS. 1A to 1C to FIG. 34, a first embodiment is described.

<Overview of Embodiment>
<Generation of Spherical Panoramic Image>

Referring to FIGS. 1A to 1C to 7, a description is given of generating a spherical panoramic image.

First, a description is given of an external view of an image capturing device 1, with reference to FIGS. 1A to 1C.

The image capturing device 1 is a digital camera for capturing images from which a three-dimensional spherical image is generated. In one example, the spherical image captured by the image capturing device 1 is a 360-degree spherical panoramic image. FIGS. 1A to 1C are respectively a left side view, a front view, and a plan view of the image capturing device 1.

As illustrated in FIG. 1A, the image capturing device 1 has a shape such that one can hold it with one hand. Further, as illustrated in FIGS. 1A, 1B, and 1C, an imaging element 103a is provided on a front side (anterior side) of an upper section of the image capturing device 1, and an imaging element 103b is provided on a back side (rear side) thereof. These imaging elements (image sensors) 103a and 103b are used in combination with optical members (e.g., fisheye lenses 102a and 102b of FIG. 10, described below), each being configured to capture a hemispherical image having an angle of view of 180 degrees or wider. As illustrated in FIG. 1B, the image capturing device 1 further includes an operation unit 115 such as a shutter button on the rear side of the image capturing device 1, which is opposite of the front side of the image capturing device 1.

Next, a description is given of a situation where the image capturing device 1 is used, with reference to FIG. 2. FIG. 2 illustrates an example of how a user uses the image capturing device 1. As illustrated in FIG. 2, for example, the image capturing device 1 is used for capturing objects surrounding the user who is holding the image capturing device 1 in his or her hand. The imaging elements 103a and 103b illustrated in FIGS. 1A to 1C capture the objects surrounding the user to obtain two hemispherical images.

Figure 4B:
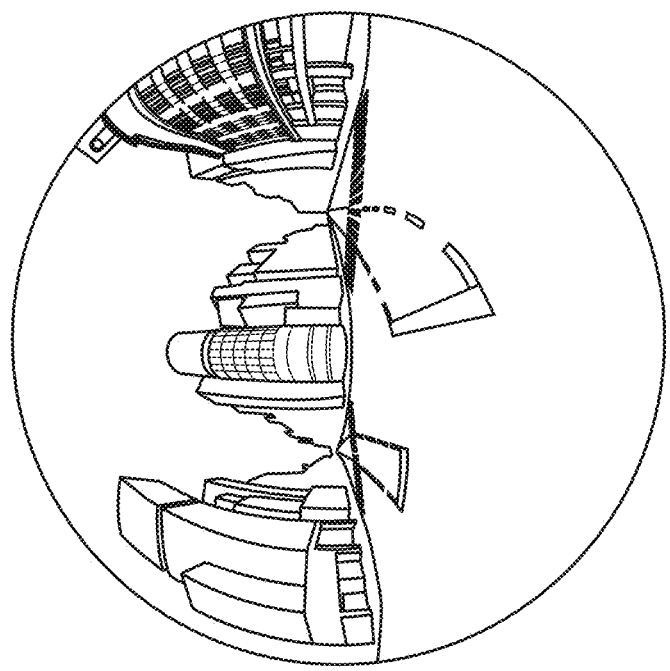
FIG. 4B is an illustration of a spherical panoramic image, according to an embodiment of the present disclosure.
Figure 4A:
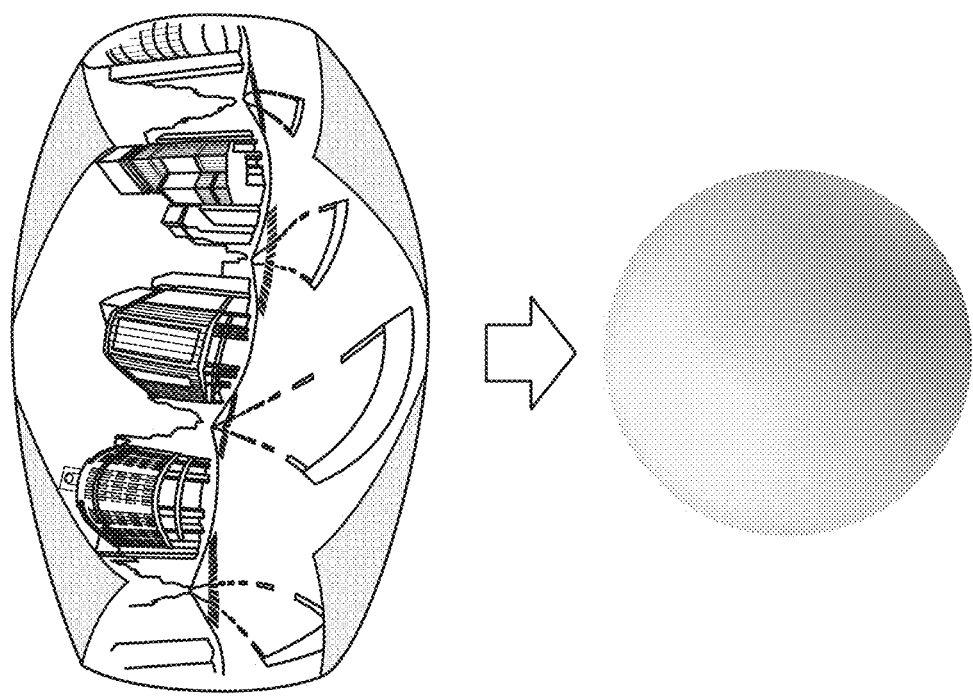
FIG. 4A is an illustration of a Mercator image covering a sphere, according to an embodiment of the present disclosure.

Next, a description is given of an overview of an operation of generating a spherical panoramic image from the images captured by the image capturing device 1, with reference to FIGS. 3A to 3C and FIGS. 4A and 4B. FIG. 3A is a view illustrating a front side of a hemispherical image captured by the image capturing device 1. FIG. 3B is a view illustrating a back side of a hemispherical image captured by the image capturing device 1. FIG. 3C is a view illustrating an image in Mercator projection. The image in Mercator projection as illustrated in FIG. 3C is referred to as a "Mercator image" hereinafter. FIG. 4A is a conceptual diagram illustrating an example of how the Mercator image maps to a surface of a sphere. FIG. 4B is a view illustrating a spherical panoramic image.

As illustrated in FIG. 3A, an image captured by the imaging element 103a is a curved hemispherical image (front side) taken through the fisheye lens 102a described later. Also, as illustrated in FIG. 3B, an image captured by the imaging element 103b is a curved hemispherical image (back side) taken through the fisheye lens 102b described later. The hemispherical image (front side) and the hemispherical image (back side), which is reversed by 180-degree from each other, are combined by the image capturing device 1. This result in generation of the Mercator image as illustrated in FIG. 3C.

The Mercator image is mapped on the sphere surface using Open Graphics Library for Embedded Systems (OpenGL ES) as illustrated in FIG. 4A. This results in generation of the spherical panoramic image as illustrated in FIG. 4B. In other words, the spherical panoramic image is represented as the Mercator image, which corresponds to a surface facing a center of the sphere. It should be noted that OpenGL ES is a graphic library used for visualizing two-dimensional (2D) and three-dimensional (3D) data. The spherical panoramic image is either a still image or a moving image.

One may feel strange viewing the spherical panoramic image, because the spherical panoramic image is an image mapped to the sphere surface. To resolve this strange feeling, an image of a predetermined area, which is a part of the spherical panoramic image, is displayed as a planar image having fewer curves. The image of the predetermined area is referred to as a "predetermined-area image" hereinafter. Hereinafter, a description is given of displaying the predetermined-area image, with reference to FIG. 5 and FIGS. 6A and 6B.

Figure 6A:
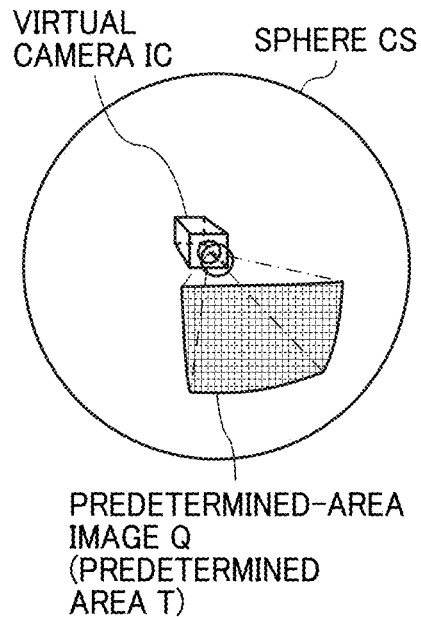
FIG. 6A is a perspective view of FIG. 5.
Figure 6B:
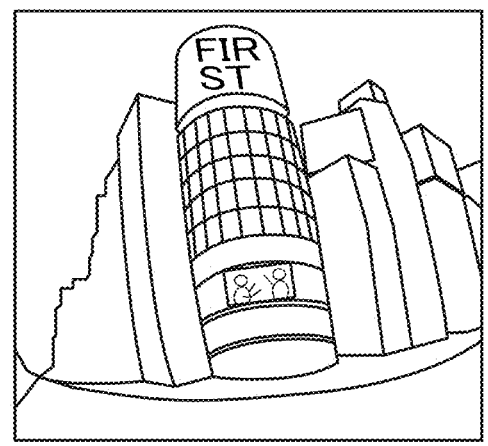
FIG. 6B is an illustration of an image of the predetermined area displayed on a display of a communication terminal, according to an embodiment of the present disclosure.

FIG. 5 is a view illustrating positions of a virtual camera IC and a predetermined area T in a case where the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is outside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. In another example, the predetermined-area image Q is specified by an imaging area (X, Y, Z) of the virtual camera IC, i.e., the predetermined area T, rather than the predetermined-area information, i.e., the position coordinate of the virtual camera IC. The following explains the position of the virtual camera IC, using an imaging direction (rH, rV) and an angle of view a of the virtual camera IC.

Figure 7:
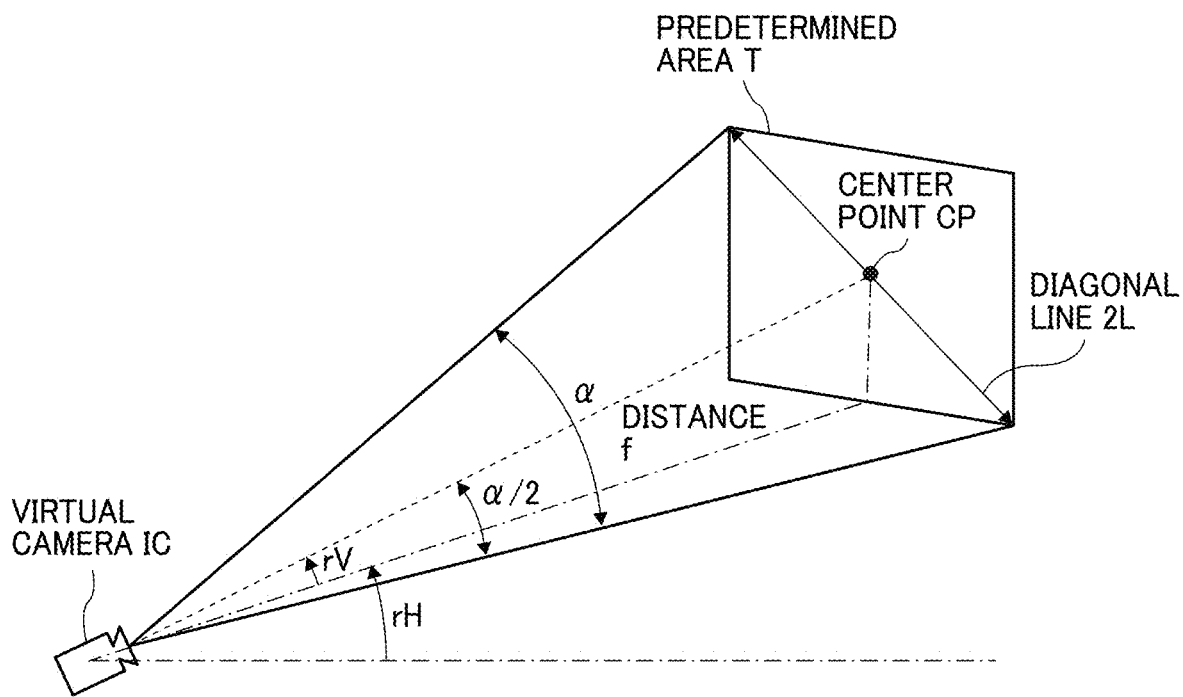
FIG. 7 is a view illustrating a relation between predetermined-area information and a predetermined-area image, according to an embodiment of the present disclosure.

Referring to FIG. 7, a relation between the predetermined-area information and an image of the predetermined area T is described according to the embodiment. FIG. 7 is a view illustrating a relation between the predetermined-area information and the predetermined area T. As illustrated in FIG. 7, "rH" denotes a horizontal radian, "rV" denotes a vertical radian, and "a" denotes an angle of view, respectively, of the virtual camera IC. The position of the virtual camera IC is adjusted, such that the point of gaze of the virtual camera IC, indicated by the imaging direction (rH, rV), matches a center point CP of the predetermined area T as the imaging area of the virtual camera IC. The predetermined-area image Q is an image of the predetermined area T, in the spherical image CE. "f" denotes a distance from the virtual camera IC to the center point CP of the predetermined area T. L is a distance between the center point CP and a given vertex of the predetermined area T (2L is a diagonal line). In FIG. 7, a trigonometric function equation generally expressed by the following equation 1 is satisfied.

$$L/f = \tan(\alpha/2) \tag{Equation 1}$$

Figure 8:
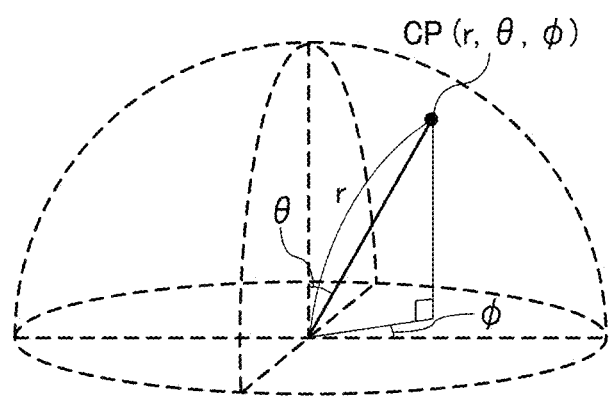
FIG. 8 is a view illustrating points in a three-dimensional Euclidean space according to spherical coordinates, according to an embodiment of the present disclosure.

FIG. 8 is a view illustrating points in a three-dimensional Euclidean space according to spherical coordinates, according to the embodiment. A positional coordinate (r, θ, φ) is given when the center point CP is represented by a spherical polar coordinates system. The positional coordinate (r, θ, φ) represents a moving radius, a polar angle, and an azimuth angle. The moving radius r is a distance from an origin of the three-dimensional virtual space including the spherical panoramic image to the center point CP. Accordingly, the radius r is equal to f. FIG. 8 illustrates a relation between these items. The following description is provided using the positional coordinate (r, θ, φ) of the virtual camera IC.

<Overview of Image Communication System>

Figure 9:
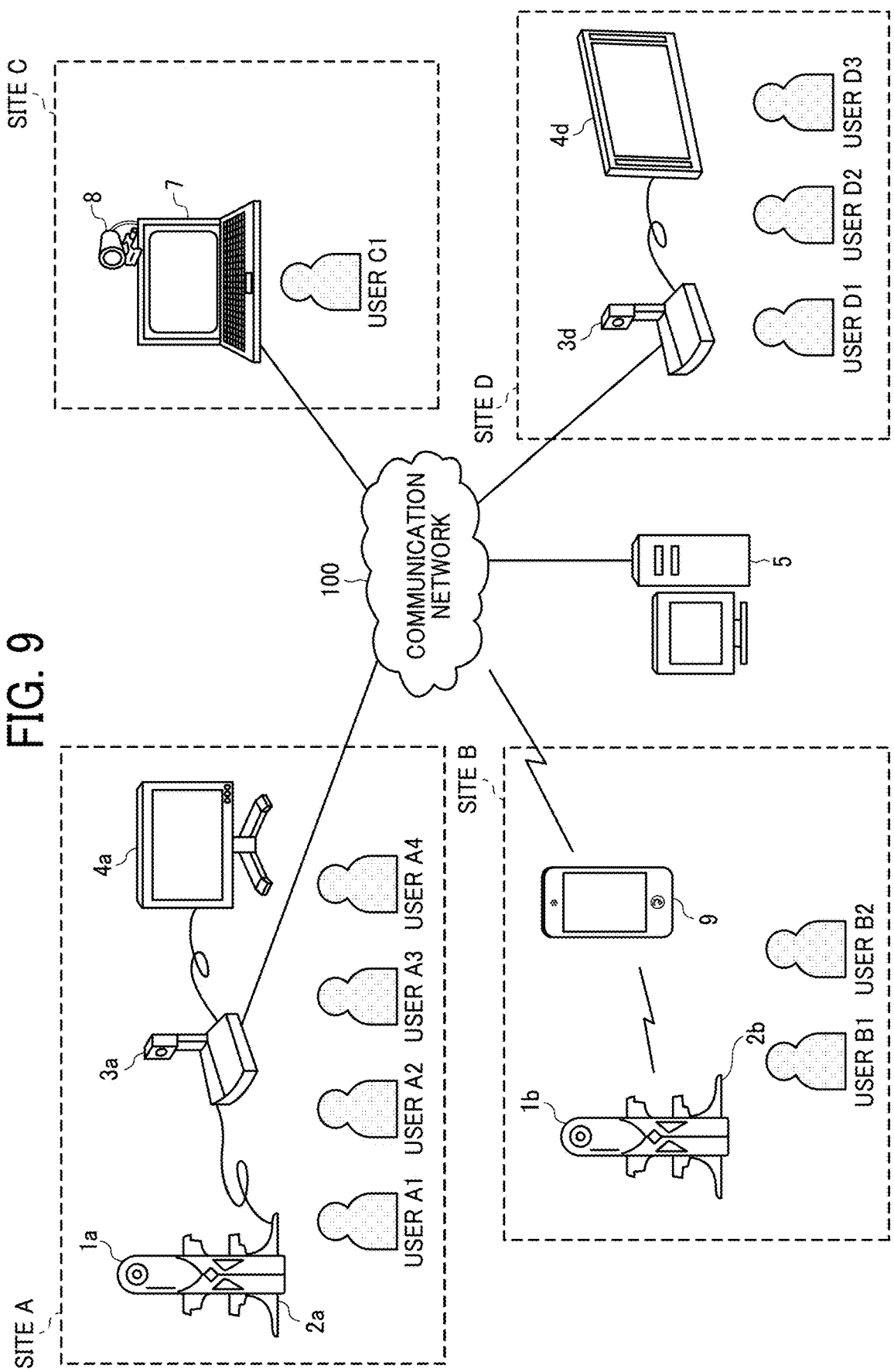
FIG. 9 is a schematic diagram illustrating a configuration of an image communication system, according to an embodiment of the present disclosure.

Referring to FIG. 9, an overview of a configuration of an image communication system according to the present embodiment is described. FIG. 9 is a schematic diagram illustrating a configuration of the image communication system according to the present embodiment.

As illustrated in FIG. 9, the image communication system according to the present embodiment includes an image capturing device 1a, an image capturing device 1b, a videoconference terminal 3a, a videoconference terminal 3d, a display 4a, a display 4d, a communication management system 5, a personal computer (PC) 7, an image capturing device 8, and a smartphone 9. The videoconference terminal 3a, the smartphone 9, the PC 7, and the videoconference terminal 3d communicate data with one another via a communication network 100 such as the Internet. The communication network 100 can be either a wireless network or a wired network.

Each of the image capturing device 1a and the image capturing device 1b is a special digital camera, which captures an image of an object or surroundings such as scenery to obtain two hemispherical images, from which a spherical panoramic image is generated. By contrast, the image capturing device 8 is a general-purpose digital camera that captures an image of a subject or surroundings to obtain a general planar image.

Each of the videoconference terminal 3a and the videoconference terminal 3d is a terminal that is dedicated to videoconferencing. The videoconference terminal 3a and the videoconference terminal 3d display an image of video calling on the display 4a and the display 4d, respectively, via a wired cable such as a universal serial bus (USB). The videoconference terminal 3a usually captures an image by a camera 312 of FIG. 11, which is described later. However, in a case where the videoconference terminal 3a is connected to a cradle 2a on which the image capturing device 1a is mounted, the image capturing device 1a is preferentially used. Accordingly, two hemispherical images are obtained, from which a spherical panoramic image is generated. When a wired cable is used for connecting the videoconference terminal 3a and the cradle 2a, the cradle 2a supplies power to the image capturing device 1a and holds the image capturing device 1a in addition to establishing a communication between the image capturing device 1a and the videoconference terminal 3a. In the embodiment, the image capturing device 1a, the cradle 2a, the videoconference terminal 3a, and the display 4a are located in the same site A. In the site A, four users A1, A2, A3 and A4 are participating in video calling. On the other hand, the videoconference terminal 3d and the display 4d are located in the same site D. In the site D, three users D1, D2, and D3 are participating in video calling.

The communication management system 5 manages and controls communication among the videoconference terminal 3a, the videoconference terminal 3d, the PC 7 and the smartphone 9. Further, the communication management system 5 manages types (a general image type and a special image type) of image data to be exchanged. Accordingly, the communication management system 5 is a communication control system. In the embodiment, a special image is a spherical panoramic image. The communication management system 5 is located, for example, at a service provider that provides video communication service. In one example, the communication management system 5 is configured as a single computer. In another example, the communication management system 5 is constituted as a plurality of computers to which divided portions (functions, means, or storages) are arbitrarily allocated. In other words, the communication management system 5 can be implemented by a plurality of servers that operate in cooperation with one another.

The PC 7 performs video calling with the image capturing device 8 connected thereto. In the embodiment, the PC 7 and the image capturing device 8 are located in the same site C. In the site C, one user C is participating in video calling.

The smartphone 9 includes a display 917, which is described later, and displays an image of video calling on the display 917. The smartphone 9 includes a complementary metal oxide semiconductor (CMOS) sensor 905, and usually captures an image with the CMOS sensor 905. In addition, the smartphone 9 is configured to obtain data of two hemispherical images captured by the image capturing device 1b, from which a spherical panoramic image is generated, using wireless communication such as Wireless Fidelity (Wi-Fi) and Bluetooth (registered trademark). When wireless communication is used for obtaining the data of two hemispherical images, a cradle 2b supplies power with the image capturing device 1b and holds the image capturing device 1b, but not establish a communication. In the embodiment, the image capturing device 1b, the cradle 2b, and the smartphone 9 are located in the same site B. Further, in the site B, two users B1 and B2 are participating in video calling.

The videoconference terminal 3a, the videoconference terminal 3d, the PC 7 and the smartphone 9 are each an example of a communication terminal. OpenGL ES is installed in each of these communication terminals to enable each communication terminal to generate predetermined-area information that indicates a partial area of a spherical panoramic image, or to generate a predetermined-area image from a spherical panoramic image that is transmitted from a different communication terminal.

The arrangement of the terminals (communication terminal, display, image capturing device), apparatuses and users illustrated in FIG. 9 is just an example, and any other suitable arrangement will suffice. For example, in the site C, an image capturing device configured to capture a spherical panoramic image can be used in place of the image capturing device 8. In addition, examples of the communication terminal include a digital television, a smartwatch, and a car navigation device. In the following description, any arbitrary one of the image capturing device 1a and the image capturing device 1b is referred to as "image capturing device 1". Further, any arbitrary one of the videoconference terminal 3a and the videoconference terminal 3d is referred to as "videoconference terminal 3", hereinafter. Furthermore, any arbitrary one of the display 4a and the display 4d is referred to as "display 4", hereinafter.

<Hardware Configuration of Embodiment>

Next, referring to FIG. 10 to FIG. 13, a description is given in detail of hardware configurations of the image capturing device 1, the videoconference terminal 3, the communication management system 5, the PC 7, and the smartphone 9, according to the present embodiment. Since the image capturing device 8 is a general-purpose camera, a detailed description thereof is omitted.

<Hardware Configuration of Image Capturing Device 1>

Figure 10:
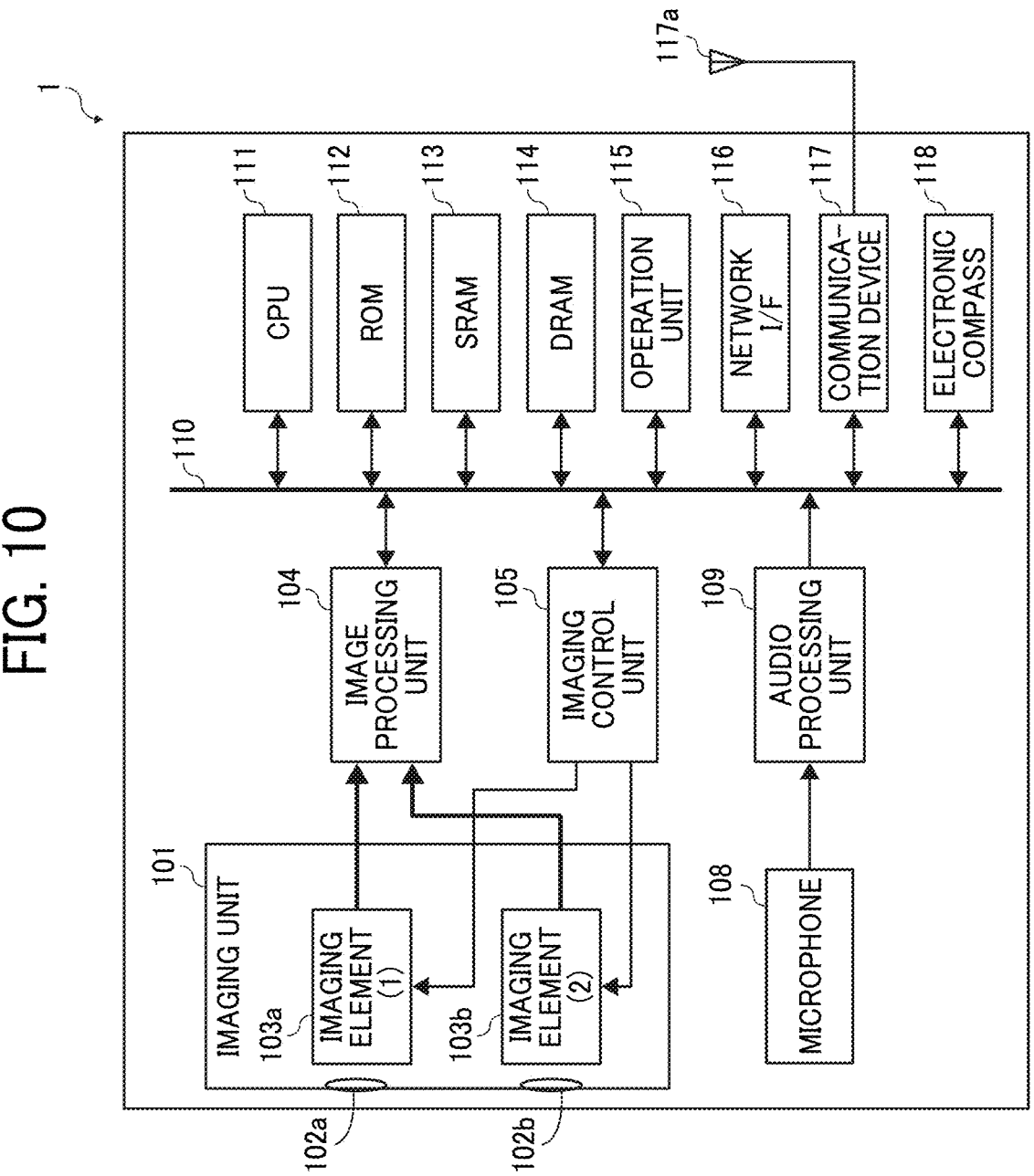
FIG. 10 is a block diagram illustrating a hardware configuration of the image capturing device, according to an embodiment of the present disclosure.

First, referring to FIG. 10, a hardware configuration of the image capturing device 1 is described according to the embodiment. FIG. 10 is a block diagram illustrating a hardware configuration of the image capturing device 1 according to the embodiment. The following describes a case in which the image capturing device 1 is a spherical (omnidirectional) image capturing device having two imaging elements. However, the image capturing device 1 may include any suitable number of imaging elements, providing that it includes at least two imaging elements. In addition, the image capturing device 1 is not necessarily an image capturing device dedicated to omnidirectional image capturing. In another example, an external omnidirectional image capturing unit can be attached to a general-purpose digital camera or a smartphone to implement an image capturing device having substantially the same function as that of the image capturing device 1.

As illustrated in FIG. 10, the image capturing device 1 includes an imaging unit 101, an image processing unit 104, an imaging control unit 105, a microphone 108, an audio processing unit 109, a central processing unit (CPU) 111, a read only memory (ROM) 112, a static random access memory (SRAM) 113, a dynamic random access memory (DRAM) 114, the operation unit 115, a network interface (I/F) 116, a communication device 117, and an antenna 117a.

The imaging unit 101 includes two wide-angle lenses (so-called fisheye lenses) 102a and 102b, each having an angle of view of equal to or greater than 180 degrees so as to form a hemispherical image. The imaging unit 101 further includes the two imaging elements 103a and 103b corresponding to the fisheye lenses 102a and 102b respectively. The imaging elements 103a and 103b each includes an imaging sensor such as a CMOS sensor and a charge-coupled device (CCD) sensor, a timing generation circuit, and a group of registers. The imaging sensor converts an optical image formed by the fisheye lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processing unit 104 via a parallel I/F bus. In addition, each of the imaging elements 103a and 103b of the imaging unit 101 is connected to the imaging control unit 105 via a serial I/F bus such as an I2C bus. The image processing unit 104 and the imaging control unit 105 are each connected to the CPU 111 via a bus 110. Furthermore, the ROM 112, the SRAM 113, the DRAM 114, the operation unit 115, the network I/F 116, the communication device 117, and the electronic compass 118 are also connected to the bus 110.

The image processing unit 104 acquires image data from each of the imaging elements 103a and 103b via the parallel I/F bus and performs predetermined processing on each image data. Thereafter, the image processing unit 104 combines these image data to generate data of the Mercator image as illustrated in FIG. 3C.

The imaging control unit 105 usually functions as a master device while the imaging elements 103a and 103b each usually functions as a slave device. The imaging control unit 105 sets commands and the like in the group of registers of the imaging elements 103a and 103b via the serial I/F bus such as the I2C bus. The imaging control unit 105 receives necessary commands from the CPU 111. Further, the imaging control unit 105 acquires status data and the like of the group of registers of the imaging elements 103a and 103b via the serial I/F bus such as the I2C bus. The imaging control unit 105 sends the acquired status data and the like to the CPU 111.

The imaging control unit 105 instructs the imaging elements 103a and 103b to output the image data at a time when the shutter button of the operation unit 115 is pressed. In some cases, the image capturing device 1 is configured to display a preview image on a display (e.g., a display of the videoconference terminal 3a) or to display a moving image (movie). In case of displaying movie, image data are continuously output from the imaging elements 103a and 103b at a predetermined frame rate (frames per minute).

Furthermore, the imaging control unit 105 operates in cooperation with the CPU 111, to synchronize the time when the imaging element 103a outputs image data and the time when the imaging element 103b outputs the image data. It should be noted that, although the image capturing device 1 does not include a display in the present embodiment, the image capturing device 1 can include a display.

The microphone 108 converts sound to audio data (signal). The audio processing unit 109 acquires audio data output from the microphone 108 via an I/F bus and performs predetermined processing on the audio data.

The CPU 111 controls entire operation of the image capturing device 1 and performs necessary processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processing unit 104 and data of the Mercator image on which processing has been performed.

The operation unit 115 collectively refers to various operation keys, a power switch, the shutter button, and a touch panel having functions of both displaying information and receiving input from a user, which can be used in combination. A user operates the operation keys to input various image capturing (photographing) modes or image capturing (photographing) conditions.

The network I/F 116 collectively refers to an interface circuit such as a USB I/F that allows the image capturing device 1 to communicate data with an external medium such as an SD card or an external personal computer. The network I/F 116 supports at least one of wired and wireless communications. The data of the Mercator image, which is stored in the DRAM 114, is stored in the external medium via the network I/F 116 or transmitted to the external device such as the videoconference terminal 3a via the network I/F 116, at any desired time.

The communication device 117 communicates data with an external device such as the videoconference terminal 3a via the antenna 117a of the image capturing device 1 using a short-range wireless communication network such as Wi-Fi and Near Field Communication (NFC). The communication device 117 is also configured to transmit the data of Mercator image to the external device such as the videoconference terminal 3a.

The electronic compass 118 calculates an orientation and a tilt (roll angle) of the image capturing device 1 from the Earth's magnetism to output orientation and tilt information. This orientation and tilt information is an example of related information, which is metadata described in compliance with Exif. This information is used for image processing such as image correction of captured images. The related information also includes data of a time (date) when an image is captured by the image capturing device 1, and data of an amount of image data, for example.

<Hardware Configuration of Videoconference Terminal 3>

Figure 11:
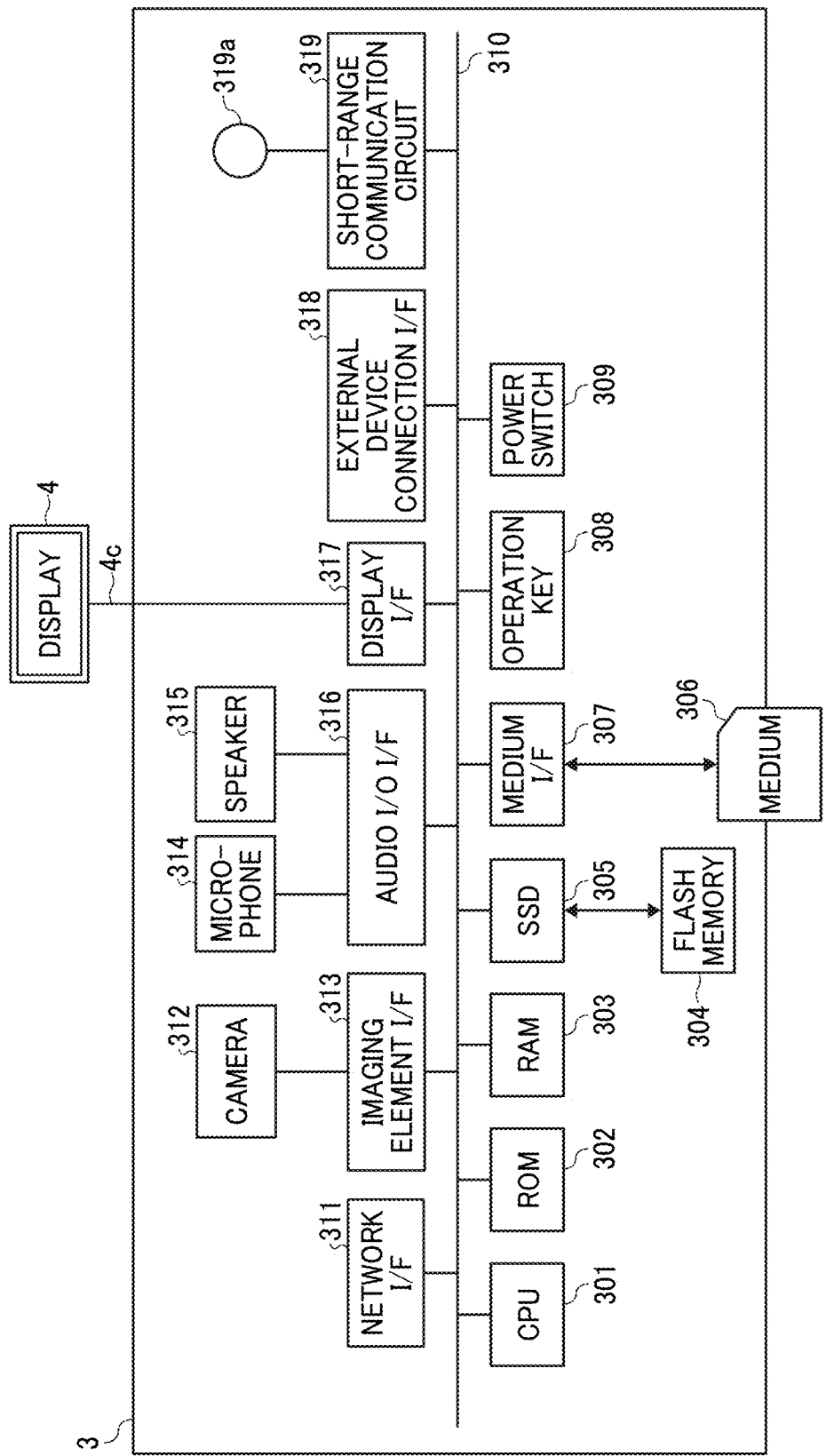
FIG. 11 is a block diagram illustrating a hardware configuration of a videoconference terminal, according to an embodiment of the present disclosure.

Next, referring to FIG. 11, a hardware configuration of the videoconference terminal 3 is described according to the embodiment. FIG. 11 is a block diagram illustrating a hardware configuration of the videoconference terminal 3 according to the embodiment. As illustrated in FIG. 11, the videoconference terminal 3 includes a CPU 301, a ROM 302, a RAM 303, a flash memory 304, a solid state drive (SSD) 305, a medium I/F 307, an operation key 308, a power switch 309, a bus line 310, a network I/F 311, a camera 312, an imaging element I/F 313, a microphone 314, a speaker 315, an audio input/output I/F 316, a display I/F 317, an external device connection I/F 318, a short-range communication circuit 319, and an antenna 319a for the short-range communication circuit 319.

The CPU 301 controls entire operation of the videoconference terminal 3. The ROM 302 stores a control program such as an Initial Program Loader (IPL) to boot the CPU 301. The RAM 303 is used as a work area for the CPU 301. The flash memory 304 stores various data such as a communication control program, image data, and audio data. The SSD 305 controls reading or writing of various data to or from the flash memory 304 under control of the CPU 301. In alternative to the SSD, a hard disc drive (HDD) can be used. The medium I/F 307 controls reading or writing (storing) of data with respect to a storage medium 306 such as a flash memory. The operation key (keys) 308 is operated by a user to input a user instruction such as a user selection of a communication destination of the videoconference terminal 3. The power switch 309 is a switch that turns on or off the power of the videoconference terminal 3.

The network I/F 311 in an interface that controls communication of data with an external device through the communication network 100 such as the Internet. The camera 312 is an example of a built-in imaging device configured to capture a subject under control of the CPU 301 to obtain image data. The imaging element I/F 313 is a circuit that controls driving of the camera 312. The microphone 314 is an example of a built-in audio collecting device configured to input audio. The audio input/output I/F 316 is a circuit for controlling input and output of audio signals between the microphone 314 and the speaker 315 under control of the CPU 301. The display I/F 317 is a circuit for transmitting image data to the external display 4 under control of the CPU 301. The external device connection I/F 318 is an interface that connects the videoconference terminal 3 to various external devices. The short-range communication circuit 319 is a communication circuit that communicates in compliance with the NFC (registered trademark), the Bluetooth (registered trademark) and the like.

The bus line 310 is an address bus, a data bus or the like, which electrically connects the elements in FIG. 11 such as the CPU 301.

The display 4 is an example of display means for displaying an image of a subject, an operation icon, etc. The display 4 is configured as a liquid crystal display or an organic electroluminescence (EL) display, for example. The display 4 is connected to the display I/F 317 by a cable 4c. For example, the cable 4c is an analog red green blue (RGB) (video graphic array (VGA)) signal cable, a component video cable, a high-definition multimedia interface (HDMI) (registered trademark) signal cable, or a digital video interactive (DVI) signal cable.

The camera 312 includes a lens and a solid-state imaging element that converts an image (video) of a subject to electronic data by converting light to electric charge. As the solid-state imaging element, for example, a CMOS sensor or a CCD sensor is used. The external device connection I/F 318 is configured to connect an external device such as an external camera, an external microphone, or an external speaker through a USB cable or the like. When an external camera is connected, the external camera is driven in preference to the built-in camera 312 under control of the CPU 301. Similarly, when an external microphone is connected or an external speaker is connected, the external microphone or the external speaker is driven in preference to the built-in microphone 314 or the built-in speaker 315 under control of the CPU 301.

The storage medium 306 is removable from the videoconference terminal 3. In addition to or in alternative to the flash memory 304, any suitable nonvolatile memory, such as an electrically erasable and programmable ROM (EEPROM) can be used, provided that it reads or writes data under control of CPU 301.

<Hardware Configuration of Communication Management System 5 and PC 7>

Figure 12:
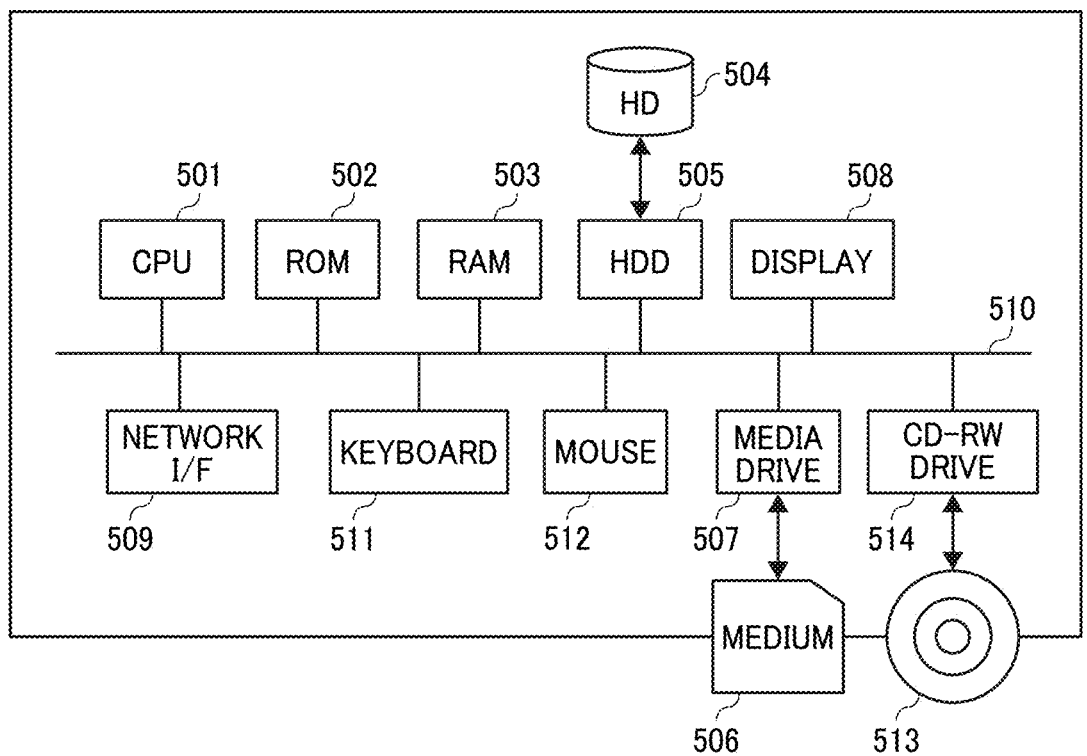
FIG. 12 is a block diagram illustrating a hardware configuration of any one of a communication management system and a personal computer, according to an embodiment of the present disclosure.

Next, referring to FIG. 12, a hardware configuration of any one of the communication management system 5 and the PC 7 is described according to the embodiment. FIG. 12 is a block diagram illustrating a hardware configuration of any one of the communication management system 5 and the PC 7 according to the embodiment. In the embodiment, both the communication management system 5 and the PC 7 are implemented by a computer. Therefore, a description is given of a configuration of the communication management system 5, and the description of a configuration of the PC 7 is omitted, having the same or substantially the same configuration as that of the communication management system 5.

The communication management system 5 includes a CPU 501, a ROM 502, a RAM 503, a hard disc (HD) 504, an HDD 505, a media drive 507, a display 508, a network I/F 509, a keyboard 511, a mouse 512, a compact disc rewritable (CD-RW) drive 514, and a bus line 510. The CPU 501 controls entire operation of the communication management system 5. The ROM 502 stores a control program such as an IPL to boot the CPU 501. The RAM 503 is used as a work area for the CPU 501. The HD 504 stores various types of data, such as a control program for the communication management system 5. The HDD 505 controls reading or writing of various data to or from the HD 504 under control of the CPU 501. The media drive 507 controls reading or writing (storing) of data from and to a storage medium 506 such as a flash memory. The display 508 displays various information such as a cursor, menu, window, characters, or image. The network I/F 509 is an interface that controls communication of data with an external device through the communication network 100. The keyboard 511 includes a plurality of keys to allow a user to input characters, numerals, or various instructions. The mouse 512 allows a user to select a specific instruction or execution, select a target for processing, or move a cursor being displayed. The CD-RW drive 514 controls reading or writing of various data to and from a CD-RW 513, which is one example of a removable storage medium. The bus line 510 is an address bus, a data bus or the like, which electrically connects the above-described hardware elements, as illustrated in FIG. 12.

<Hardware Configuration of Smartphone 9>

Figure 13:
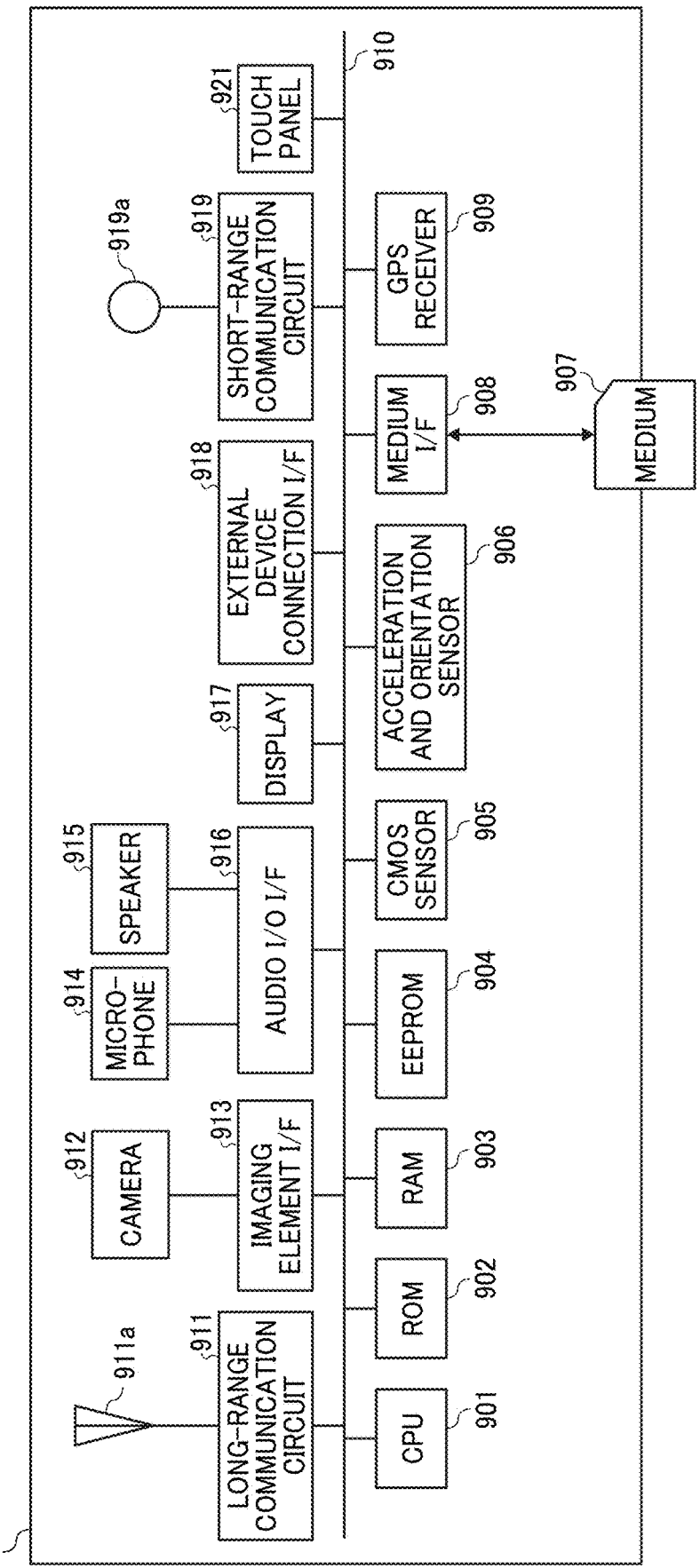
FIG. 13 is a block diagram illustrating a hardware configuration of a smartphone, according to an embodiment of the present disclosure.

Referring to FIG. 13, a hardware configuration of the smartphone 9 is described according to the embodiment. FIG. 13 is a block diagram illustrating a hardware configuration of the smartphone 9 according to the embodiment. As illustrated in FIG. 13, the smartphone 9 includes a CPU 901, a ROM 902, a RAM 903, an EEPROM 904, a CMOS sensor 905, an acceleration and orientation sensor 906, a medium I/F 908, and a global positioning system (GPS) receiver 909.

The CPU 901 controls entire operation of the smartphone 9. The ROM 902 stores a control program such as an IPL to boot the CPU 901. The RAM 903 is used as a work area for the CPU 901. The EEPROM 904 reads or writes various data such as a control program for the smartphone 9 under control of the CPU 901. The CMOS sensor 905 captures an object (mainly, a user operating the smartphone 9) under control of the CPU 901 to obtain image data. The acceleration and orientation sensor 906 includes various sensors such as an electromagnetic compass for detecting geomagnetism, a gyrocompass, and an acceleration sensor. The medium I/F 908 controls reading or writing of data to and from a storage medium 907 such as a flash memory. The GPS receiver 909 receives a GPS signal from a GPS satellite.

The smartphone 9 further includes a long-range communication circuit 911, a camera 912, an imaging element I/F 913, a microphone 914, a speaker 915, an audio input/output I/F 916, a display 917, an external device connection I/F 918, a short-range communication circuit 919, an antenna 919a for the short-range communication circuit 919, and a touch panel 921.

The long-range communication circuit 911 is a circuit that communicates with other device through the communication network 100. The camera 912 is an example of a built-in imaging device configured to capture a subject under control of the CPU 901 to obtain image data. The imaging element I/F 913 is a circuit that controls driving of the camera 912. The microphone 914 is an example of a built-in audio collecting device configured to input audio. The audio input/output I/F 916 is a circuit for controlling input and output of audio signals between the microphone 914 and the speaker 915 under control of the CPU 901. The display 917 is an example of a display device that displays an image of a subject, various icons, etc. The display 917 is configured as a liquid crystal display or an organic EL display, for example. The external device connection I/F 918 is an interface that connects the smartphone 9 to various external devices. The short-range communication circuit 919 is a communication circuit that communicates in compliance with the NFC, the Bluetooth and the like. The touch panel 921 is an example of an input device that enables a user to operate the smartphone 9 by touching a screen of the display 917.

The smartphone 9 further includes a bus line 910. The bus line 910 is an address bus, a data bus or the like, which electrically connects the elements in FIG. 13 such as the CPU 901.

It should be noted that a storage medium such as a CD-ROM storing any of the above-described programs and/or an HD storing any of the above-described programs can be distributed domestically or overseas as a program product.

<Functional Configuration of Embodiment>

Figure 14:
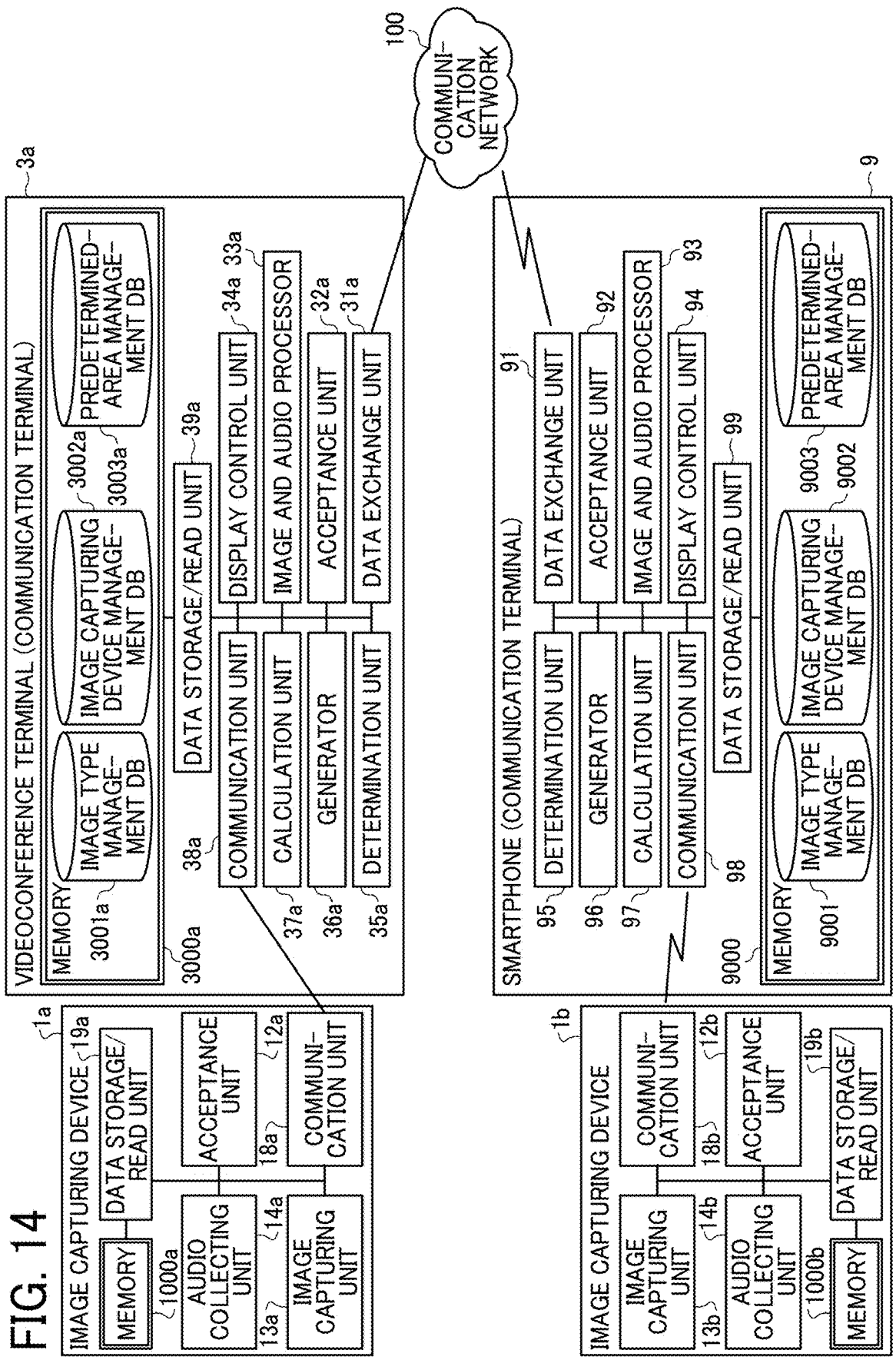
FIG. 14 is a block diagram illustrating a part of a functional configuration of the image communication system, according to an embodiment of the present disclosure.
Figure 15:
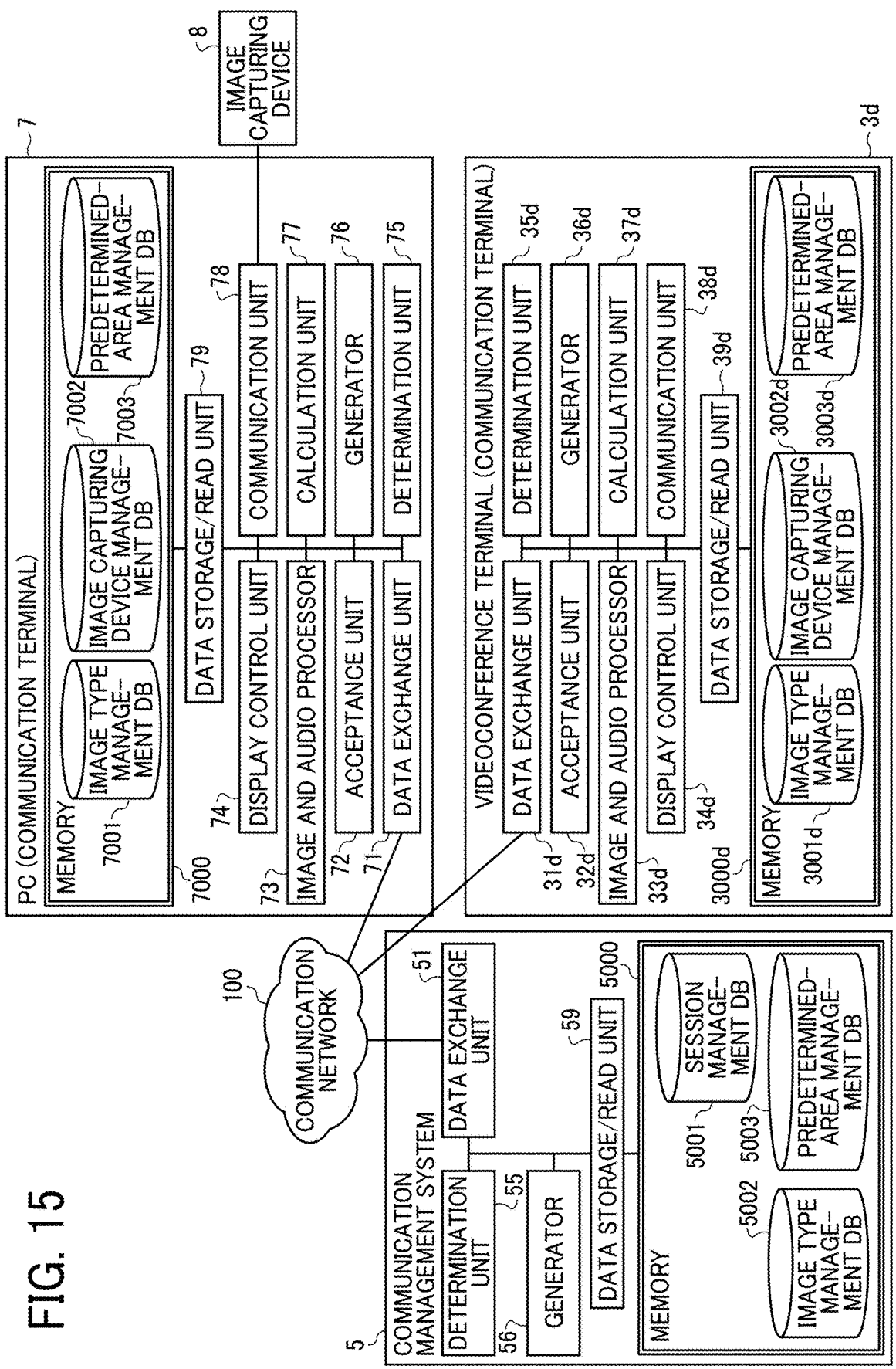
FIG. 15 is a block diagram illustrating another part of the functional configuration of the image communication system, according to an embodiment of the present disclosure.

Referring to FIGS. 14 to 20, a functional configuration of the image communication system is described according to the present embodiment. FIG. 14 and FIG. 15 are block diagrams, each illustrating a part of a functional configuration of the image communication system.

<Functional Configuration of Image Capturing Device 1a>

As illustrated in FIG. 14, the image capturing device 1a includes an acceptance unit 12a, an image capturing unit 13a, an audio collecting unit 14a, a communication unit 18a, and a data storage/read unit 19a. Each of the above-mentioned units is a function or means that is implemented by or that is caused to function by operating any one or more of the hardware elements illustrated in FIG. 10 in cooperation with instructions from the CPU 111 according to a control program for the image capturing device 1a, expanded from the SRAM 113 to the DRAM 114.

The image capturing device 1a further includes a memory 1000a, which is implemented by the ROM 112, the SRAM 113, and the DRAM 114 illustrated in FIG. 10. The memory 1000a stores therein a globally unique identifier (GUID) identifying the own device (i.e., the image capturing device 1a itself).

The image capturing device 1b includes an acceptance unit 12b, an image capturing unit 13b, an audio collecting unit 14b, a communication unit 18b, a data storage/read unit 19b, and a memory 1000b. These functional units of the image capturing device 1b implement the similar or substantially the similar functions as those of the acceptance unit 12a, the image capturing unit 13a, the audio collecting unit 14a, the communication unit 18a, the data storage/read unit 19a, and the memory 1000a of the image capturing device 1a, respectively. Therefore, redundant descriptions thereof are omitted below.

(Each Functional Unit of Image Capturing Device 1a)

Referring to FIG. 10 and FIG. 14, each of the functional units of the image capturing device 1a is described in detail.

The acceptance unit 12a of the image capturing device 1a is mainly implemented by the operation unit 115 illustrated in FIG. 10, which operates under control of the CPU 111. The acceptance unit 12a receives an instruction input from the operation unit 115 according to a user operation.

The image capturing unit 13a is implemented mainly by the imaging unit 101, the image processing unit 104, and the imaging control unit 105, illustrated in FIG. 10, each of which operates under control of the CPU 111. The image capturing unit 13a captures an image of an object or surroundings to obtain captured-image data.

The audio collecting unit 14a is mainly implemented by the microphone 108 and the audio processing unit 109 illustrated in FIG. 10, each of which operates under control of the CPU 111. The audio collecting unit 14a collects sounds around the image capturing device 1a.

The communication unit 18a, which is mainly implemented by instructions of the CPU 111, communicates data with a communication unit 38a of the videoconference terminal 3a using a short-range wireless communication network in compliance with NFC, Bluetooth, or Wi-Fi, for example.

The data storage/read unit 19a, which is mainly implemented by instructions of the CPU 111 illustrated in FIG. 10, stores various data or information in the memory 1000a or reads out various data or information from the memory 1000a.

<Functional Configuration of Videoconference Terminal 3a>

As illustrated in FIG. 14, the videoconference terminal 3a includes a data exchange unit 31a, an acceptance unit 32a, an image and audio processor 33a, a display control unit 34a, a determination unit 35a, a generator 36a, a calculation unit 37a, communication unit 38a, and a data storage/read unit 39a. Each of the above-mentioned units is a function or means that is implemented by or that is caused to function by operating any one or more of the hardware elements illustrated in FIG. 11 in cooperation with instructions from the CPU 301 according to a control program for the videoconference terminal 3a, expanded from the flash memory 304 to the RAM 303.

The videoconference terminal 3a further includes a memory 3000a, which is implemented by the ROM 302, the RAM 303, and the flash memory 304 illustrated in FIG. 11. The memory 3000a includes an image type management DB 3001a, an image capturing device management DB 3002a, and a predetermined-area management DB 3003a. Among these DBs, the image type management DB 3001a is implemented by an image type management table as illustrated in FIG. 16. The image capturing device management DB 3002a is implemented by an image capturing device management table as illustrated in FIG. 17. The predetermined-area management DB 3003a is implemented by a predetermined-area management table as illustrated in FIG. 18.

The videoconference terminal 3d includes a data exchange unit 31d, an acceptance unit 32d, an image and audio processor 33d, a display control unit 34d, a determination unit 35d, a generator 36d, a calculation unit 37d, a communication unit 38d, and a data storage/read unit 39d, and a memory 3000d. These functional units of the videoconference terminal 3d implement the similar of substantially the similar functions as those of the data exchange unit 31a, the acceptance unit 32a, the image and audio processor 33a, the display control unit 34a, the determination unit 35a, the generator 36a, the calculation unit 37a, the communication unit 38a, the data storage/read unit 39a, and the memory 3000a of the videoconference terminal 3a. Therefore, redundant descriptions thereof are omitted below. In addition, the memory 3000d of the videoconference terminal 3d includes an image type management DB 3001d, and an image capturing device management DB 3002d, and a predetermined-area management DB 3003d. These DBs 3001d, 3002d and 3003d have the same or the substantially the same data structure as the image type management DB 3001a, the image capturing device management DB 3002a, and the predetermined-area management DB 3003a of the videoconference terminal 3a, respectively. Therefore, redundant descriptions thereof are omitted below.

(Image Type Management Table)

FIG. 16 is an illustration of an example data structure of the image type management table. The image type management table stores an image data identifier (ID), an internet protocol (IP) address, which is an example of an address of a terminal as a transmission source of image data, and a source name, in association with one another. The terminal as a transmission source is hereinafter referred to as a "sender terminal". The image data ID is one example of image data identification information identifying image data to be used in video communication. An identical image data ID is assigned to image data transmitted from the same sender terminal. Accordingly, a destination terminal (that is, a communication terminal that receives image data) identifies a sender terminal from which the received image data is transmitted. An IP address of the sender terminal, which is associated with specific image data ID, is an IP address of a communication terminal that transmits image data identified by that image data ID associated with the IP address. A source name, which is associated with specific image data ID, is a name for specifying an image capturing device that outputs the image data identified by that image data ID associated with the source name. The source name is one example of image type information. The source name is a name generated by a communication terminal such as the videoconference terminal 3a according to a predetermined naming rule.

The example of the image type management table illustrated in FIG. 16 indicates that four communication terminals, whose IP addresses are respectively "1.2.1.3", "1.2.2.3", "1.3.1.3", and "1.3.2.3" transmit image data identified by the image data ID "RS001", "RS002", "RS003", and "RS004", respectively. Further, according to the image type management table illustrated in FIG. 16, the image types represented by the source names of those four communication terminals are "Video_Theta", "Video_Theta", "Video", and "Video" that indicated the image types, which are "special image", "special image", "general image", and "general image", respectively. In the embodiment, the "special image" is a spherical panoramic image.

In another example, data other than the image data are stored in the image type management table in association with the image data ID. Examples of the data other than the image data include audio data and presentation material data to be shared on a screen. In addition, data other than the image data may be stored in the image type management table in association with the image data ID. Examples of the data other than the image data include audio data and presentation material data to be shared on a screen.

(Image Capturing Device Management Table)

FIG. 17 is an illustration of an example data structure of the image capturing device management table. The image capturing device management table stores a vendor ID and a product ID among the GUID of an image capturing device that is configured to obtain two hemispherical images, from which a spherical panoramic image is generated. As the GUID, a combination of a vendor ID (VID) and a product ID (PID) used in a USB device is used, for example. The vendor ID and the product ID are stored in a communication terminal such as a videoconference terminal before shipment. In another example, these IDs are added and stored in the videoconference terminal after shipment.

(Predetermined-Area Management Table)

FIG. 18 is an illustration of an example data structure of the predetermined-area management table. The predetermined-area management table stores an IP address of a communication terminal (sender terminal) as a transmission source of captured-image data representing a captured image, an IP address of a communication terminal (destination terminal) as a destination of the captured-image data, and predetermined-area information indicating a predetermined-area image being displayed at the destination terminal, in association with one another. The destination terminal of the captured-image data is identical with the sender terminal of the predetermined-area information. The predetermined-area information is a conversion parameter used to convert from a captured image to an image (predetermined-area image) of a predetermined area T of the captured image, as illustrated in FIG. 6A, FIG. 6B, and FIG. 7. The IP address is used as one example of address information. Other examples of the address information include a media access control (MAC) address and a terminal ID, which identifies a corresponding communication terminal. In the embodiment, an IPv4 address is simplified to represent the IP address. In another example, an IPv6 address is used as the IP address.

In the example of FIG. 18, the predetermined-area management table indicates, in the first line to the third line of the table, that the videoconference terminal 3a having an IP address of "1.2.1.3" transmits captured-image data, via the communication management system 5, to the videoconference terminal 3d having an IP address of "1.2.2.3", the PC 7 having an IP address of "1.3.1.3", and the smartphone 9 having an IP address of "1.3.2.3". Further, the predetermined-area management table illustrated in FIG. 18 indicates that the videoconference terminal 3d is a sender terminal of the predetermined-area information (r=10, θ=20, φ=30). In substantially the same manner, the predetermined-area management table indicates that the PC 7 is a sender terminal of the predetermined-area information (r=20, θ=30, φ=40). Furthermore, the predetermined-area management table indicates that the smartphone 9 is a sender terminal of the predetermined-area information (r=30, θ=40, φ=50).

When the data exchange unit 31a newly receives predetermined-area information including the same set of IP addresses of the sender terminal of captured-image data and the destination terminal of captured-image data as that currently managed in the table, the data storage/read unit 39a overwrites currently managed predetermined-area information with the newly received predetermined-area information.

(Each Functional Unit of Videoconference Terminal 3a)

Referring to FIG. 11 and FIG. 14, each of the functional units of the videoconference terminal 3a is described in detail.

The data exchange unit 31a of the videoconference terminal 3a is mainly implemented by the network I/F 311 illustrated in FIG. 11, which operates under control of the CPU 301. The data exchange unit 31a exchanges various data or information with communication management system 5 via the communication network 100.

The acceptance unit 32a is mainly implemented by the operation key 308, which operates under control of the CPU 301. The acceptance unit 32a receives selections or inputs according to a user operation. In another example, an input device such as a touch panel is used in alternative to or in place of the operation key 308.

The image and audio processor 33a, which is implemented by instructions of the CPU 301 illustrated in FIG. 11, processes image data obtained by capturing a subject by the camera 312. After voice sound generated by a user is converted to audio signals by the microphone 314, the image and audio processor 33a performs processing on audio data based on the audio signals.

Further, the image and audio processor 33a processes image data received from another communication terminal based on the image type information such as the source name, to enable the display control unit 34a to control the display 4 to display an image based on the processed image data. More specifically, when the image type information indicates "special image", the image and audio processor 33a converts the image data such as hemispherical image data as illustrated in FIGS. 3A and 3B into spherical image data to generate spherical panoramic image data as illustrated in FIG. 4B, and further generates a predetermined-area image as illustrated in FIG. 6B. Furthermore, the image and audio processor 33a outputs, to the speaker 315, audio signals according to audio data received from another communication terminal via the communication management system 5. The speaker 315 outputs sound based on the audio signal.

The display control unit 34a is mainly implemented by the display I/F 317, which operates under control of the CPU 301. The display control unit 34a controls the display 4 to display various images or characters.

The determination unit 35a, which is mainly implemented by instructions of the CPU 301, determines an image type according to image data received from, for example, the image capturing device 1a.

The generator 36a is mainly implemented by instructions of the CPU 301. The generator 36a generates a source name, which is one example of the image type information, according to the above-described naming rule, based on a determination result obtained by the determination unit 35a indicating one of a general image or a special image (the "special image" is a spherical panoramic image in the embodiment). For example, when the determination unit 35a determines that the image type is a general image, the generator 36a generates a source name "Video" indicating a general image type. By contrast, when the determination unit 35a determines that the image type is a special image, the generator 36a generates a source name "Video_Theta" indicating a special image type.

The calculation unit 37a is mainly implemented by instructions of the CPU 301. The calculation unit 37a calculates a position (position information) of a predetermined area T1 with respect to a predetermined area T2 in the captured image based on predetermined-area information (i2) that is information on the predetermined area T2 and predetermined-area information (i1) that is received from another communication terminal by the data exchange unit 31a. The predetermined-area information (i1) indicates the predetermined area T1 in the captured image. In the embodiment, an image displayed when the captured image is entirely displayed may be referred to as a "whole image".

The communication unit 38a is mainly implemented by the short-range communication circuit 319 and the antenna 319a, each of which operates under control of the CPU 301. The communication unit 38a communicates data with the communication unit 18a of the image capturing device 1a using a short-range wireless communication network in compliance with NFC, Bluetooth, or Wi-Fi, for example. In the above description, the communication unit 38a and the data exchange unit 31a individually have a communication unit. In another example, the communication unit 38a and the data exchange unit 31a share a single communication unit.

The data storage/read unit 39a, which is mainly implemented by instructions of the CPU 301 illustrated in FIG. 11, stores various data or information in the memory 3000 or reads out various data or information from the memory 3000.

<Functional Configuration of Communication Management System 5>

Referring to FIG. 12 and FIG. 15, each of the functional units of the communication management system 5 is described in detail. The communication management system 5 includes a data exchange unit 51, a determination unit 55, a generator 56, and a data storage/read unit 59. Each of the above-mentioned units is a function or means that is implemented by or that is caused to function by operating any one or more of the hardware elements illustrated in FIG. 12 in cooperation with instructions from the CPU 501 according to a control program for the communication management system 5, expanded from the HD 504 to the RAM 503.

The communication management system 5 further includes a memory 5000, which is implemented by the RAM 503 and the HD 504 illustrated in FIG. 12. The memory 5000 includes a session management DB 5001, an image type management DB 5002, and a predetermined-area management DB 5003. The session management DB 5001 is implemented by a session management table illustrated in FIG. 19. The image type management DB 5002 is implemented by an image type management table illustrated in FIG. 20. The predetermined-area management DB 5003 is implemented by a predetermined-area management table illustrated in FIG. 21.

(Session Management Table)

FIG. 19 is an illustration of an example data structure of the session management table. The session management table stores a session ID and an IP address of a participant communication terminal, in association with each other. The session ID is one example of session identification information for identifying a session that implements video calling. The session ID is generated for each virtual conference room. The session ID is also stored in each communication terminal such as the videoconference terminal 3a. Each communication terminal selects a desired session ID from the session ID or IDs stored therein. The IP address of the participant communication terminal indicates an IP address of the communication terminal participating in a virtual conference room identified by the associated session ID.

(Image Type Management Table)

FIG. 20 is an illustration of an example data structure of the image type management table. The image type management table illustrated in FIG. 20 stores, in addition to the information items stored in the image type management table illustrated in FIG. 16, the same session IDs as those stored in the session management table, in association with one another. The example of the image type management table illustrated in FIG. 20 indicates that three communication terminals whose IP addresses are "1.2.1.3", "1.2.2.3", and "1.3.1.3" are participating in the virtual conference room identified by the session ID "se101". The communication management system 5 stores the same image data ID, IP address of the sender terminal, and image type information as those stored in a communication terminal, such as the videoconference terminal 3a. This enables the communication management system 5 to transmit the image type information, etc., to a communication terminal that is currently participating in a video call and another communication terminal that newly participates in the video call by entering a virtual conference room of the video communication. Accordingly, the communication terminal that is already in the video calling and the communication terminal that is newly participates in the video calling do not have to exchange such information as the image type information with each other.

(Predetermined-Area Management Table)

FIG. 21 is an illustration of an example data structure of the predetermined-area management table. The predetermined-area management illustrated in FIG. 21 has substantially the same data structure as the predetermined-area management table illustrated in FIG. 18. However, as described later, since the data exchange unit 51 transmits, to each communication terminal, the latest predetermined-area information at regular intervals such as every thirty seconds, all the predetermined-area information received by the data exchange unit 51 during a period from when the predetermined-area information is transmitted last time to when the most recent predetermined-area information is transmitted, is kept stored without being deleted. In the example of FIG. 21, the more recent the predetermined-area information is, the upper row in the predetermined-area management table.

(Each Functional Unit of Communication Management System 5)

Referring to FIG. 12 and FIG. 15, each of the functional units of the communication management system 5 is described in detail.

The data exchange unit 51 of the communication management system 5 is mainly implemented by the network I/F 509, which operates under control of the CPU 501 illustrated in FIG. 12. The data exchange unit 51 exchanges various data or information with the videoconference terminal 3a, the videoconference terminal 3d, or the PC 7 through the communication network 100.

The determination unit 55, which is mainly implemented by instructions of the CPU 501, performs various determinations.

The generator 56, which is mainly implemented by instructions of the CPU 501, generates an image data ID.

The data storage/read unit 59 is mainly implemented by the HDD 505 illustrated in FIG. 12, when operates under control of the CPU 501. The data storage/read unit 59 stores various data or information in the memory 5000 or reads out various data or information from the memory 5000.

<Functional Configuration of PC 7>

Referring to FIGS. 12 and 15, a functional configuration of the PC 7 is described according to the embodiment. The PC 7 has substantially the same functions as those of the videoconference terminal 3a. In other words, as illustrated in FIG. 15, the PC 7 includes a data exchange unit 71, an acceptance unit 72, an image and audio processor 73, a display control unit 74, a determination unit 75, a generator 76, a calculation unit 77, a communication unit 78, and a data storage/read unit 79. Each of the above-mentioned units is a function or means that is implemented by or that is caused to function by operating any one or more of the hardware elements illustrated in FIG. 12 in cooperation with instructions from the CPU 501 according to a control program for the PC 7, expanded from the HD 504 to the RAM 503.

The PC 7 further includes a memory 7000, which is implemented by the ROM 502, the RAM 503 and the HD 504 illustrated in FIG. 12. The memory 7000 includes an image type management DB 7001, an image capturing device management DB 7002, and a predetermined-area management DB 7003. The image type management DB 7001, the image capturing device management DB 7002, and the predetermined-area management DB 7003 have substantially the same data structure as the image type management DB 3001a, the image capturing device management DB 3002a, and the predetermined-area management DB 3003a, respectively, and redundant descriptions thereof are omitted below.

(Each Functional Unit of PC 7)

The data exchange unit 71 of the PC 7 is mainly implemented by the network I/F 509, which operates under control of the CPU 501 illustrated in FIG. 12. The data exchange unit 71 implements the similar or substantially the similar function to that of the data exchange unit 31a.

The acceptance unit 72 is mainly implemented by the keyboard 511 and the mouse 512, which operates under control of the CPU 501. The acceptance unit 72 implements the similar or substantially the similar function to that of the acceptance unit 32a. The image and audio processor 73, which is mainly implemented by instructions of the CPU 501, implements the similar or substantially the similar function to that of the image and audio processor 33a. The display control unit 74, which is mainly implemented by instructions of the CPU 501, implements the similar or substantially the similar function to that of the display control unit 34a. The determination unit 75, which is mainly implemented by instructions of the CPU 501, implements the similar or substantially the similar function to that of the determination unit 35a. The generator 76, which is mainly implemented by instructions of the CPU 501, implements the similar or substantially the similar function to that of the generator 36*a*. The calculation unit 77, which is mainly implemented by instructions of the CPU 501, implements the similar or substantially the similar function to that of the calculation unit 37*a*. The communication unit 78, which is mainly implemented by instructions of the CPU 501, implements the similar or substantially the similar function to that of the communication unit 38*a*. The data storage/read unit 79, which is mainly implemented by instructions of the CPU 501, stores various data or information in the memory 7000 or reads out various data or information from the memory 7000.

<Functional Configuration of Smartphone 9>

Referring to FIG. 13 and FIG. 14, a functional configuration of the smartphone 9 is described according to the embodiment. The smartphone 9 has substantially the same functions as the videoconference terminal 3*a*. In other words, as illustrated in FIG. 14, the smartphone 9 includes a data exchange unit 91, an acceptance unit 92, an image and audio processor 93, a display control unit 94, a determination unit 95, a generator 96, a calculation unit 97, a communication unit 98, and a data storage/read unit 99. Each of the above-mentioned units is a function or means that is implemented by or that is caused to function by operating any one or more of the hardware elements illustrated in FIG. 13 in cooperation with instructions from the CPU 901 according to a control program for the smartphone 9, expanded from the EEPROM 904 to the RAM 903.

The smartphone 9 further includes a memory 9000, which is implemented by the ROM 902, the RAM 903, and the EEPROM 904 illustrated in FIG. 13. The memory 9000 includes an image type management DB 9001, an image capturing device management DB 9002, and a predetermined-area management DB 9003. The image type management DB 9001, the image capturing device management DB 9002, and the predetermined-area management DB 9003 have substantially the same data structure as the image type management DB 3001*a*, the image capturing device management DB 3002*a*, and the predetermined-area management DB 3003*a*, respectively, and redundant descriptions thereof are omitted below.

(Each Functional Unit of Smartphone 9)

The data exchange unit 91 of the smartphone 9 is mainly implemented by the long-range communication circuit 911 illustrated in the FIG. 13, which operates under control of the CPU 901. The data exchange unit 91 implements the similar or substantially the similar function to that of the data exchange unit 31*a*.

The acceptance unit 92 is mainly implemented by the touch panel 921, which operates under control of the CPU 901. The acceptance unit 92 implements the similar or substantially the similar function to that of the acceptance unit 32*a*.

The image and audio processor 93, which is mainly implemented by instructions of the CPU 901, implements the similar or substantially the similar function to that of the image and audio processor 33*a*. The display control unit 94, which is mainly implemented by instructions of the CPU 901, implements the similar or substantially the similar function to that of the display control unit 34*a*. The determination unit 95, which is mainly implemented by instructions of the CPU 901, implements the similar or substantially the similar function to that of the determination unit 35*a*. The generator 96, which is mainly implemented by instructions of the CPU 901, implements the similar or substantially the similar function to that of the generator 36*a*. The calculation unit 97, which is mainly implemented by instructions of the CPU 901, implements the similar or substantially the similar function to that of the calculation unit 37*a*. The communication unit 98, which is mainly implemented by instructions of the CPU 901, implements the similar or substantially the similar function to that of the communication unit 38*a*. The data storage/read unit 99, which is implemented by instructions of the CPU 901, stores various data or information in the memory 9000 or reads out various data or information from the memory 9000.

<Operation or Processes of Embodiment>

Referring to FIGS. 22 to 34, a description is given of an operation or processes according to the present embodiment.

<Participation Process>

Figure 22:
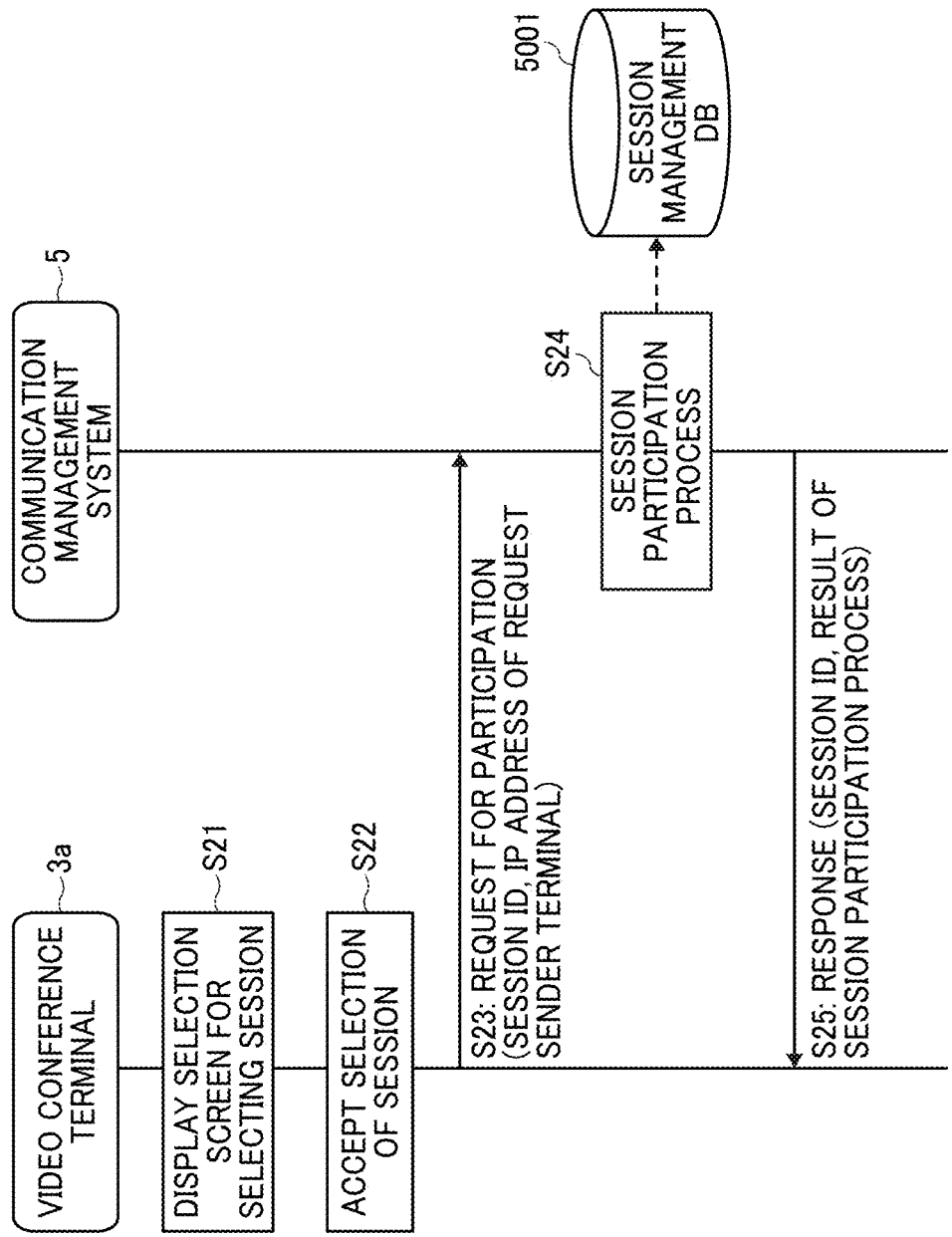
FIG. 22 is a sequence diagram illustrating an operation of participating in a specific communication session, according to an embodiment of the present disclosure.
Figure 23:
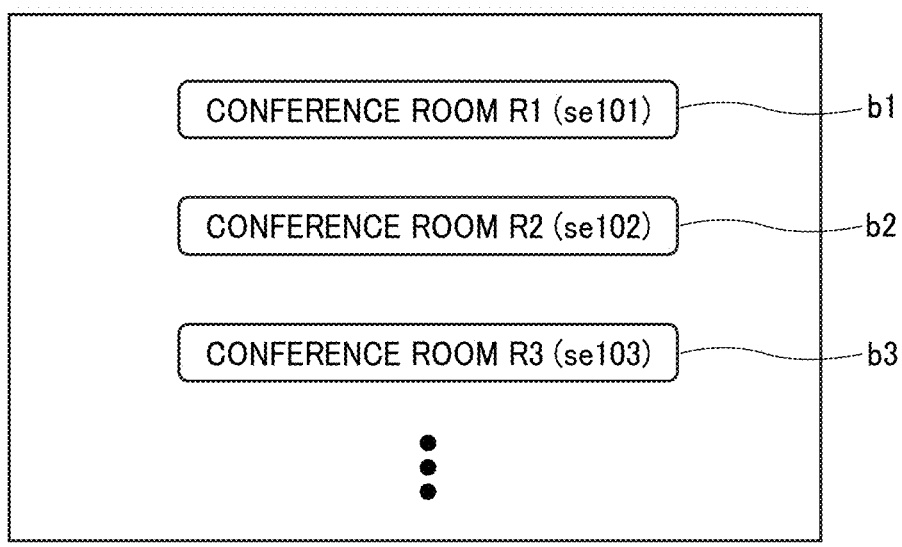
FIG. 23 is an illustration of a session selection screen for selecting a communication session (virtual conference room), according to an embodiment of the present disclosure.

Referring to FIG. 22 and FIG. 23, a participation process of participating in a specific communication session is described according to the embodiment. FIG. 22 is a sequence diagram illustrating a participation process of participating in a specific communication session according to the embodiment. FIG. 23 is an illustration of a session selection screen for selecting a communication session (virtual conference room) according to the embodiment.

When a user in the site A (e.g., user A1) operates the videoconference terminal 3*a* to display the session selection screen for selecting a desired communication session (virtual conference room), the acceptance unit 32*a* receives the operation to display the session selection screen. Accordingly, the display control unit 34*a* controls the display 4*a* to display the session selection screen as illustrated in FIG. 23 (step S21). In the session selection screen, selection buttons b1, b2, and b3 are displayed. The selection buttons b1, b2, and b3 respectively indicates virtual conference rooms R1, R2, R3, each of which is a selection target. Each of the selection buttons b1, b2, and b3 is associated with a corresponding session ID.

When the user A1 selects a desired selection button (in this example, the selection button b1) on the session selection screen, the acceptance unit 32*a* accepts selection of a corresponding communication session (step S22). Then, the data exchange unit 31*a* transmits a request to participate in the communication session, namely to enter the corresponding virtual conference room, to the communication management system 5 (step S23). This participation request includes the session ID identifying the communication session for which the selection is accepted at S22, and the IP address of the videoconference terminal 3*a*, which is a request sender terminal. The communication management system 5 receives the participation request at the data exchange unit 51.

Next, the data storage/read unit 99 performs a process for enabling the videoconference terminal 3*a* to participate in the communication session (step S24). More specifically, the data storage/read unit 99 adds, in the session management DB 5001 (FIG. 19), the IP address that is received at S23 to a field of the participant terminal IP address in a record of the session ID that is the same as the session ID received at S23. The data exchange unit 51 transmits a response to the participation request to the videoconference terminal 3*a* (step S25). This response to the participation request includes the session ID that is received at S23, and a result of the participation process. The videoconference terminal 3*a* receives the response to the participation request at the data exchange unit 31*a*. The following describes a case where the process for enabling the videoconference terminal 3*a* to participate in the communication session, namely the participation process, is successfully completed.

<Process of Managing Image Type Information>

Figure 24:
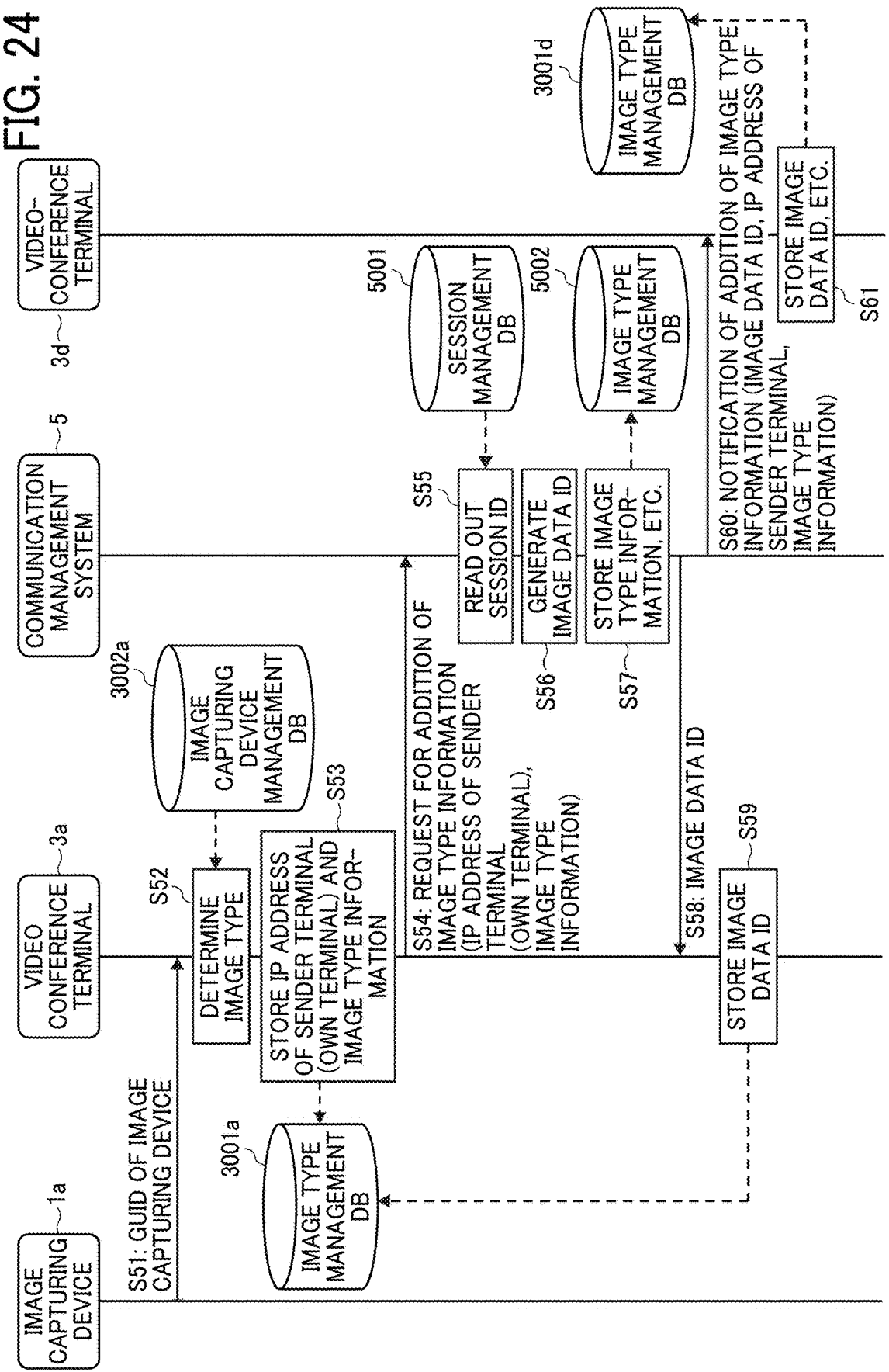
FIG. 24 is a sequence diagram illustrating an operation of managing image type information, according to an embodiment of the present disclosure.

Next, referring to FIG. 24, a management process of the image type information is described according to the embodiment. FIG. 24 is a sequence diagram illustrating a management process of the image type information according to the embodiment.

When a user (e.g., the user A1) in the site A connects the cradle 2a, on which the image capturing device 1a is mounted, to the videoconference terminal 3a, using a wired cable such as a USB cable, the data storage/read unit 19a of the image capturing device 1a reads out the GUID of the own device (e.g., the image capturing device 1a) from the memory 1000a. Then, the communication unit 18a transmits the own device's GUID to the communication unit 38a of the videoconference terminal 3a (step S51). The videoconference terminal 3a receives the GUID of the image capturing device 1a at the communication unit 38a.

Subsequently, the determination unit 35a of the videoconference terminal 3a determines whether a vendor ID and a product ID same as the GUID received at S51 are stored in the image capturing device management DB 3002a (see FIG. 17) to determine the image type (step S52). More specifically, the determination unit 35a determines that the image capturing device 1a is an image capturing device that captures a special image (a spherical panoramic image, in the embodiment), based on determination that the same vender ID and product ID are stored in the image capturing device management DB 3002a. By contrast, the determination unit 35a determines that the image capturing device 1a is an image capturing device that captures a general image, based on determination that the same vender ID and product ID are not stored in the image capturing device management DB 3002a.

Next, the data storage/read unit 39a stores, in the image type management DB 3001a (FIG. 16), the IP address of the own terminal (i.e., videoconference terminal 3a), which is a sender terminal, in association with the image type information, which is a determination result determined at S52 (step S53). In this state, the image data ID is not yet associated. Examples of the image type information include a source name, which is determined according to the naming rule, and an image type (general image or special image).

Then, the data exchange unit 31a transmits a request for addition of the image type information to the communication management system 5 (step S54). This request for addition of image type information includes the IP address of the own terminal as a sender terminal, and the image type information, both being stored at S53 in association with each other. The communication management system 5 receives the request for addition of the image type information at the data exchange unit 51.

Next, the data storage/read unit 59 of the communication management system 5 searches the session management DB 5001 (FIG. 19) using the IP address of the sender terminal received at S54 as a search key, to read out the session ID associated with the IP address (step S55).

Next, the generator 56 generates a unique image data ID (step S56). Then, the data storage/read unit 59 stores, in the image type management DB 5002 (FIG. 20), a new record associating the session ID that is read out at S55, the image data ID generated at S56, the IP address of the sender terminal and the image type information that are received at S54, with one another (step S57). The data exchange unit 51 transmits the image data ID generated at S56 to the videoconference terminal 3a. The videoconference terminal 3a receives the image data ID at the data exchange unit 31a (step S58).

Next, the data storage/read unit 39a of the videoconference terminal 3a stores, in the image type management DB 3001a (see FIG. 16), the image data ID received at S58, in association with the IP address of the own terminal (i.e., videoconference terminal 3a) as the sender terminal and the image type information that are stored at S53 (step S59).

Further, the data exchange unit 51 of the communication management system 5 transmits a notification of addition of the image type information to another communication terminal (videoconference terminal 3d in the embodiment) (step S60). This notification of addition of the image type information includes the image data ID generated at S56, and the IP address of the own terminal (i.e., videoconference terminal 3a) as the sender terminal and the image type information that are stored at S53. The videoconference terminal 3d receives the notification of addition of the image type information at the data exchange unit 31d. The destination of the notification transmitted by the data exchange unit 51 is indicated by an IP address associated with the session ID with which the IP address of the videoconference terminal 3a is associated in the session management DB 5001 (see FIG. 19). In other words, the destination includes other communication terminal(s) that is (are) in the same virtual conference room where the videoconference terminal 3a is participating.

Next, the data storage/read unit 39d of the videoconference terminal 3d stores, in the image type management DB 3001d (see FIG. 16), a new record associating the image data ID, the IP address of the sender terminal, and the image type information, which are received at S60 (step S61). In substantially the same manner, the notification of addition of the image type information is transmitted to the smartphone 9 and the PC 7, which are other communication terminal, and then the smartphone 9 and the PC 7 stores the image type information, etc. in the image type management DB 9001 and the image type management DB 7001, respectively. Through the process as described above, the same information is shared among the communication terminals by being stored in the image type management DB 3001a, the image type management DB 3001d, the image type management DB 7001 and the image type management DB 9001.

<Communication Process of Captured-Image Data>

Next, referring to FIGS. 25 to 34, a process of communicating captured-image data in video calling is described according to the embodiment. FIGS. 25A and 25B illustrate example states of video calling. More specifically, FIG. 25A illustrates a case where the image capturing device 1a is not used, while FIG. 25B illustrates a case where the image capturing device 1a is used.

Figure 25A:
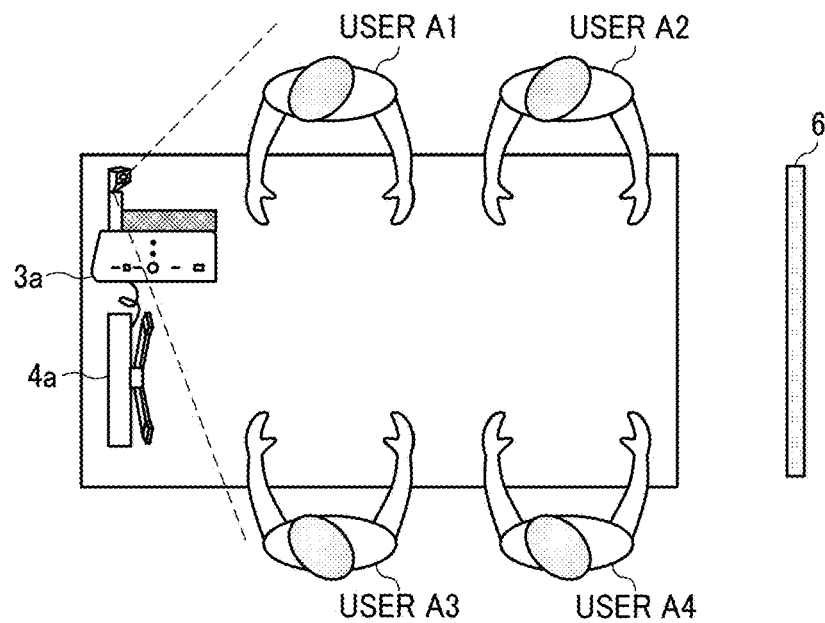
FIG. 25A is an illustration of an example state of video calling when the image capturing device of FIGS. 1A to 1C is not used, according to an embodiment of the present disclosure.

As illustrated in FIG. 25A, when the camera 312 (see FIG. 11), which is built into the videoconference terminal 3a, is used and the image capturing device 1a is not used, the videoconference terminal 3a has to be placed in a corner of a table, so that images of the users A1 to A4 can be captured by the camera 312 having a field angle that is horizontally 125 degrees and vertically 70 degrees. This requires the users A1 to A4 to talk while looking in the direction of the videoconference terminal 3a. Because the user A1 to A4 look in the direction of the videoconference terminal 3a, the display 4a also has to be placed on the same side as the videoconference terminal 3a. This requires the user A2 and the user A4, who are away from the videoconference terminal 3a, to talk in a relatively loud voice, because they are away from the microphone 314 (see FIG. 11) built in the videoconference terminal 3a. Further, the user A2 and A4 have difficulty in viewing contents displayed on the display 4a.

Figure 25B:
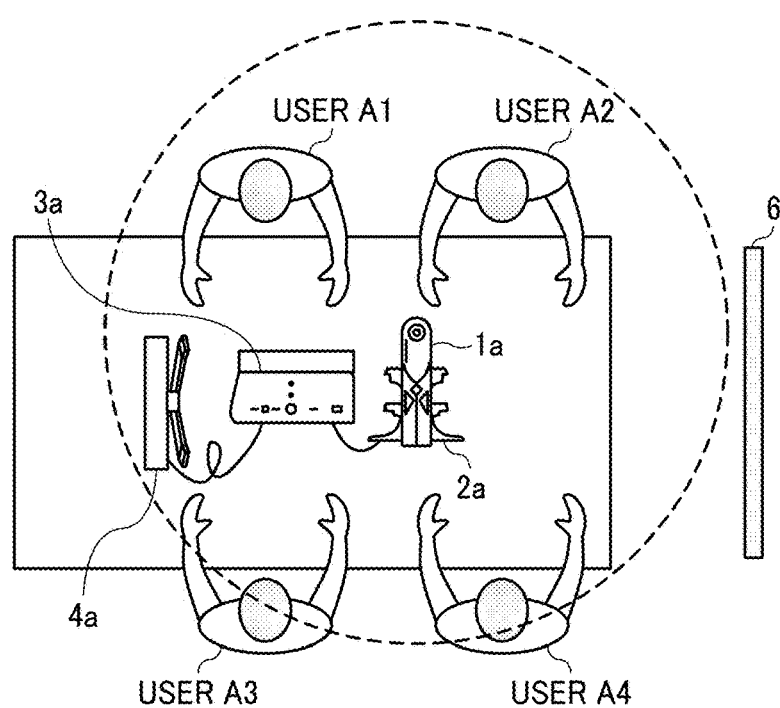
FIG. 25B is an illustration of an example state of video calling when the image capturing device of FIGS. 1A to 1C is used, according to an embodiment of the present disclosure.

By contrast, as illustrated in FIG. 25B, when the image capturing device 1a is used, the videoconference terminal 3a and the display 4a are allowed to be placed relatively in the center of the desk, because the image capturing device 1a is configured to obtain two hemispherical images, from which a spherical panoramic image is generated. Comparing with the case where the image capturing device 1a is not used as illustrated in FIG. 25A, the users A1 to A4 can talk with a relatively small volume, because they are closer to the microphone 314. Further, it gets easier for the users A1 to A4 to view contents displayed on the display 4a. In addition, in the right side of the site A, a whiteboard 6 is provided, on which the users A1 to A4 can write characters or images.

Figure 26:
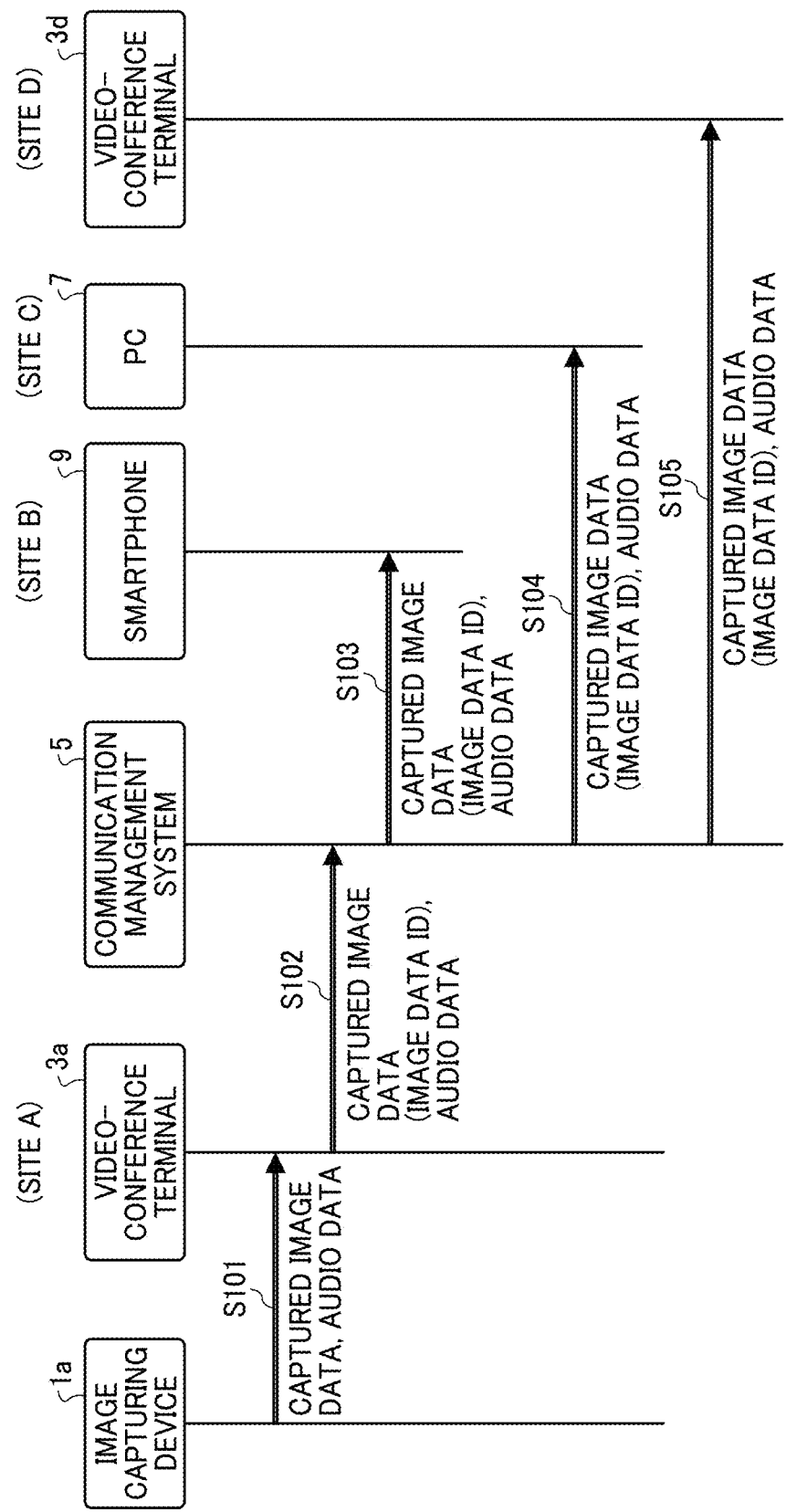
FIG. 26 is a sequence diagram illustrating an operation of transmitting captured-image data and audio data in a video call, according to an embodiment of the present disclosure.

Referring to FIG. 26, a description is given of a process of transmitting captured-image data and audio data obtained in the site A illustrated in FIG. 25B to other communication terminals (smartphone 9, PC 7, and videoconference terminal 3d) via the communication management system 5 according to the embodiment. FIG. 26 is a sequence diagram illustrating the process of transmitting captured-image data and audio data in video calling according to the embodiment.

The communication unit 18a of the image capturing device 1a transmits captured-image data obtained by capturing a subject or surrounding and audio data obtained by collecting sounds to the communication unit 38a of the videoconference terminal 3a (step S101). Because the image capturing device 1a is a device that is configured to obtain two hemispherical images, from which a spherical panoramic image is generated, the captured-image data is configured by data of the two hemispherical images as illustrated in FIG. 3A and FIG. 3B. The videoconference terminal 3a receives the captured-image data at the communication unit 38a.

Next, the data exchange unit 31a of the videoconference terminal 3a transmits, to the communication management system 5, the captured-image data and the audio data received from the image capturing device 1a (step S102). Along with the captured-image data and the audio data, an image data ID identifying the captured image data, which is a transmission target, is also transmitted. Thus, the communication management system 5 receives the captured-image data and the image data ID at the data exchange unit 51.

Next, the data exchange unit 51 of the communication management system 5 transmits the captured-image data and the audio data to other participant communication terminal (i.e., smartphone 9, the PC 7, and the videoconference terminal 3d) participating in the same video calling in which the videoconference terminal 3a is participating (steps S103, S104, S105). At each of these steps, along with the captured-image data and the audio data, the image data ID identifying the captured-image data, which is a transmission target, is also transmitted. Thus, the smartphone 9, the PC 7 and the videoconference terminal 3d receives the captured-image data, the image data ID and the audio data, at the data exchange unit 91, the data exchange unit 71, and the data exchange unit 31d.

Figure 27A:
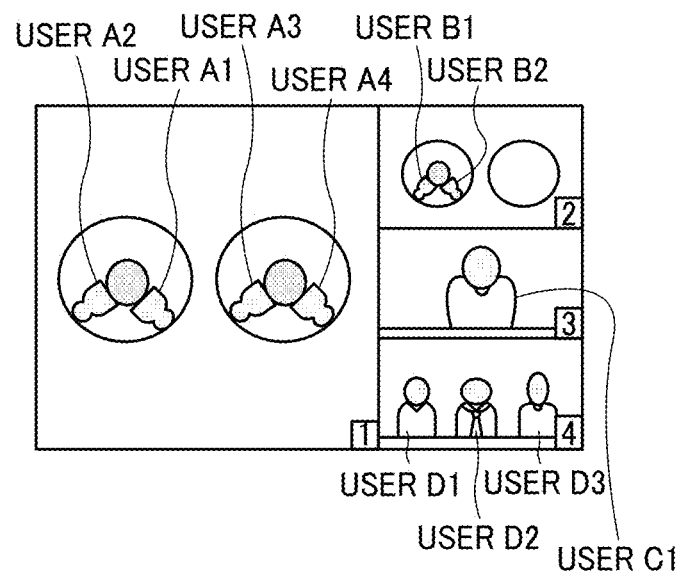
FIG. 27A is an illustration of an example of a content displayed in one site, in which image data transmitted from the image capturing device of FIGS. 1A to 1C is displayed as is, that is, without generating a spherical panoramic image and a predetermined-area image, according to an embodiment of the present disclosure.
Figure 27B:
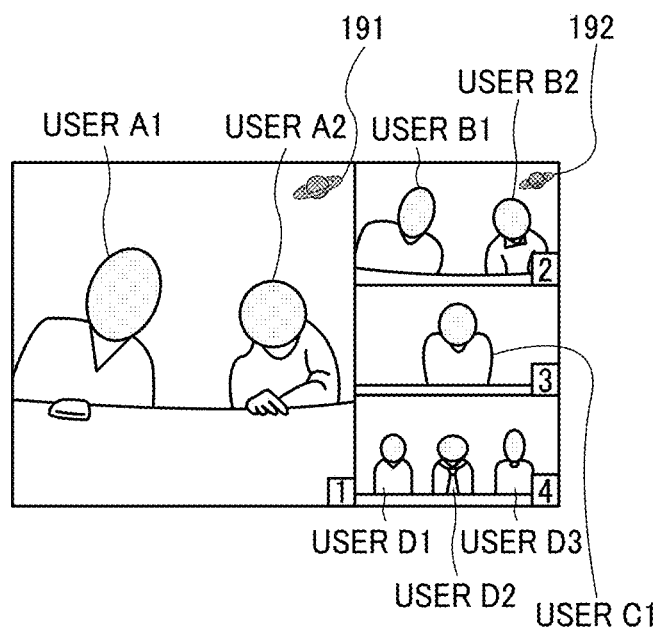
FIG. 27B is an illustration of an example of a content displayed in one site, in which a spherical panoramic image and a predetermined-area image are generated based on image data transmitted from the image capturing device of FIGS. 1A to 1C, according to an embodiment of the present disclosure.
Figure 27C:
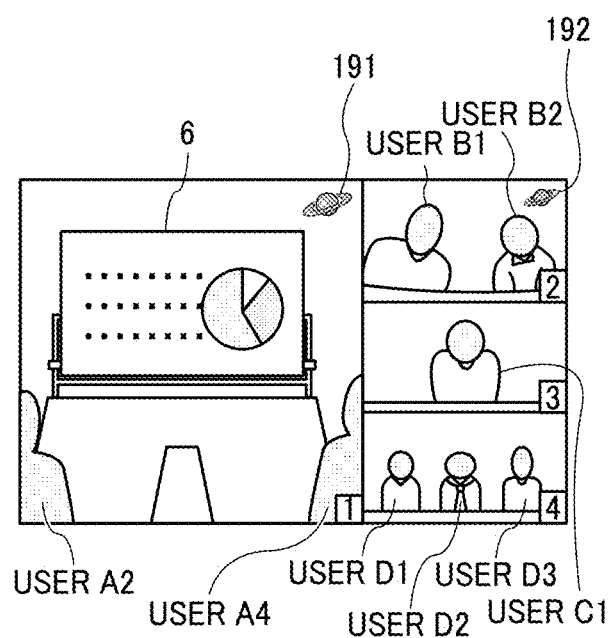
FIG. 27C is an illustration of an example of a content displayed in one site, in which the predetermined-area image of FIG. 27B is changed, according to an embodiment of the present disclosure.

Next, referring to FIGS. 27A, 27B and 27C, display examples on the display 917 in the site B are described according to the embodiment. FIG. 27A is an illustration of a screen displayed in the site B, in which the screen includes an image based on captured-image data transmitted from the image capturing device 1a in the site A via the videoconference terminal 3a, and another image based on captured image-data transmitted from the image capturing device 1b in the site B, without generating a spherical panoramic image and a predetermined-area image. By contrast, FIG. 27B is an illustration of a screen displayed in the site B, in which the screen includes images that are displayed after a spherical panoramic image and a predetermined-area image are generated based on the captured-image data transmitted from the image capturing device 1a in the site A and the image capturing device 1b in the site B. In the example of FIG. 27A to FIG. 27C, an image of the site A is displayed in a left-side display area (layout number "1") of the display 917, and an image of the site B (own site) is displayed in an upper-right display area (layout number "2"). Further, in a middle-right display area (layout number "3") of the display 917, an image of the site C is displayed, and an image of the site D is displayed in a lower-right display area (layout number "4"). The display area having the layout number "1" is a main display area, and the display areas with the layout numbers "2", "3" and "4" are sub display areas. The image to be displayed in the main display area and the image to be displayed in the sub display area can be switched in each communication terminal. In general, an image having a main person in the video calling is displayed in the main display area at each site.

When captured-image data transmitted from the image capturing device 1a and the image capturing device 1b, each being configured to capture a spherical panoramic image, are displayed as they are, the images of the site A and the site B are displayed as illustrated in FIG. 27A, i.e., each image is displayed as a combination of a hemispherical image on the front side and a hemispherical image on the back side, as respectively illustrated in FIG. 3A and FIG. 3B.

On the other hand, when the image and audio processor 93 generates a spherical panoramic image based on each of the captured-image data transmitted from the image capturing device 1a and the image capturing device 1b, each of which is configured to obtain two hemispherical images from which a spherical panoramic image is generated, and further generates a predetermined-area image, the generated predetermined-area image, which is a planar image, is displayed as illustrated in FIG. 27B. Further, in both of FIGS. 27A and 27B, the general image (planar image, in this example) is displayed in the display areas of the site C and site D, because the image capturing device 8 and the camera 312 built in the videoconference terminal 3d, each being an image capturing device that obtains a general image, are used in the site C and the site D, respectively.

Furthermore, a user in each site can change a predetermined area corresponding to the predetermined-area image in the same spherical panoramic image. For example, when the user B1 operates using the touch panel 921, the acceptance unit 92 receives the user operation to shift the predetermined-area image, and the display control unit 94 shifts, rotates, reduces, or enlarges the predetermined-area image. Thereby, a default predetermined-area image in which the user A1 and the user A2 are displayed as illustrated in FIG. 27B, is changeable to another predetermined-area image as illustrated in FIG. 27C, for example. More specifically, in FIG. 27C, the predetermined-area image is changed from one including the users A1 and A2 to another one including the whiteboard 6, in the captured image of the site A as illustrated in FIG. 25B.

Sphere icons 191 and 192 illustrated in FIGS. 27B and 27C are examples of a special image identification icon indicating an image being displayed is a predetermined-area image corresponding to the predetermined area T in a spherical panoramic image. Although in examples of FIGS.

27B and 27C, the sphere icons 191 and 192 are displayed in an upper right corner, in another example, the sphere icons 191 and 192 are displayed at any other suitable position such as in an upper left corner, a lower left corner, a lower right corner. In addition, a type of each of the sphere icons 191 and 192 is not limited to the one illustrated in FIG. 27B and FIG. 27C. Further, in alternative to or in addition to the sphere icons 191 and 192, a character string such as "Spherical Image", or a combination of an icon and characters can be used.

Figure 28:
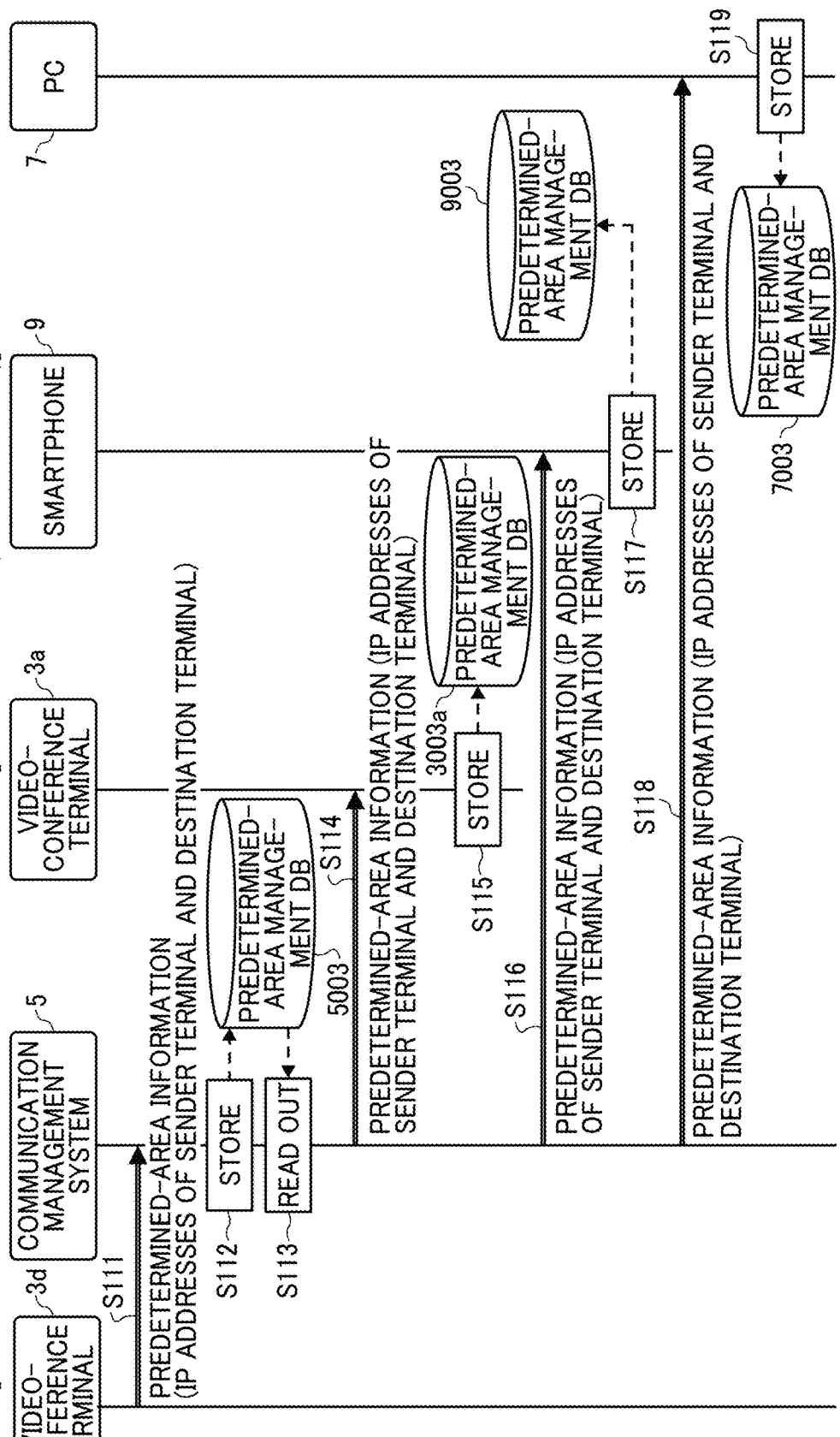
FIG. 28 is a sequence diagram illustrating an operation of sharing the predetermined-area information, according to an embodiment of the present disclosure.

Referring to FIG. 28, an operation performed by the image communication system is described, when a predetermined-area image as illustrated in FIG. 27B is displayed and the predetermined-area image is changed from the one illustrated in FIG. 27B to another one illustrated in FIG. 27C. FIG. 28 is a sequence diagram illustrating an operation of sharing predetermined-area information. In FIG. 28, the videoconference terminal 3a in the site A is an example of a third communication terminal, the videoconference terminal 3d in the site D is an example of another communication terminal, and the smartphone 9 in the site B is an example of the communication terminal (own terminal).

First, when the user D1, D2 or D3 operates the videoconference terminal 3d in the site D to display the predetermined-area image of the site A as illustrated in FIG. 27B, the data exchange unit 31d of the videoconference terminal 3d transmits, to the communication management system 5, predetermined-area information indicating the predetermined-area image currently being displayed (step S111). This predetermined-area information includes the IP address of the videoconference terminal 3a, which is a sender terminal of the captured-image data and the IP address of the videoconference terminal 3d, which is a destination terminal of the captured-image data. In this example, the videoconference terminal 3d is also a sender terminal of the predetermined-area information. The communication management system 5 receives the predetermined-area information at the data exchange unit 51.

The data storage/read unit 59 of the communication management system 5 stores, in the predetermined-area management DB 5003, the predetermined-area information and the IP address of the sender terminal and the IP address of the destination terminal, which are received at step S111, in association with one another (step S112). The processes in steps S111 and 112 are performed each time the predetermined-area image is changed in the videoconference terminal 3d, for example, from the one as illustrated in FIG. 27B to another one as illustrated in FIG. 27C.

The data storage/read unit 59 of the communication management system 5 reads out, from a plurality of sets of the predetermined-area information and the IP address of each of the sender terminal and the destination terminal stored in the predetermined-area management DB 5003, the latest (the most recently stored) set of predetermined-area information and the IP address of each of the sender terminal and the destination terminal, at regular intervals such as every thirty seconds (step S113). Next, the data exchange unit 51 distributes (transmits) the predetermined-area information and the IP addresses read in step S113, to other communication terminals (the videoconference terminal 3a, the smartphone 9, the PC 7) participating in the same video calling in which the videoconference terminal 3d, which is the sender terminal of the predetermined-area information, is participating (steps S114, S116, S118). As a result, the videoconference terminal 3a receives the predetermined-area information at the data exchange unit 31a. The data storage/read unit 39a stores the predetermined-area information and the IP addresses received in step S114 in association with one another in the predetermined-area management DB 3003a (step S115). In substantially the same manner, the smartphone 9 receives the predetermined-area information at the data exchange unit 91. The data storage/read unit 99 stores the predetermined-area information and the IP addresses received in step S116 in association with one another in the predetermined-area management DB 9003 (step S117). Further, PC 7 receives the predetermined-area information at the data exchange unit 71. The data storage/read unit 79 stores, in the predetermined-area management DB 7003, the predetermined-area information received in step S118 in association with the IP addresses that are also received in step S118 (step S119).

Thus, the predetermined-area information indicating the predetermined-area image changed in the site A is transmitted to each of the communication terminals in the other sites B, C and D participating in the same video calling. As a result, the predetermined-area information indicating the predetermined-area image being displayed in the site A is shared by the other communication terminals in the other sites B, C and D. This operation is performed in substantially the same manner, when the predetermined-area image being displayed at any one of the communication terminals in the sites B, C, and D is changed. Accordingly, the predetermined-area information indicating the predetermined-area image displayed by the communication terminal in any one of the sites is shared by the other communication terminals in the other sites which are participating in the same video calling.

Figure 29:
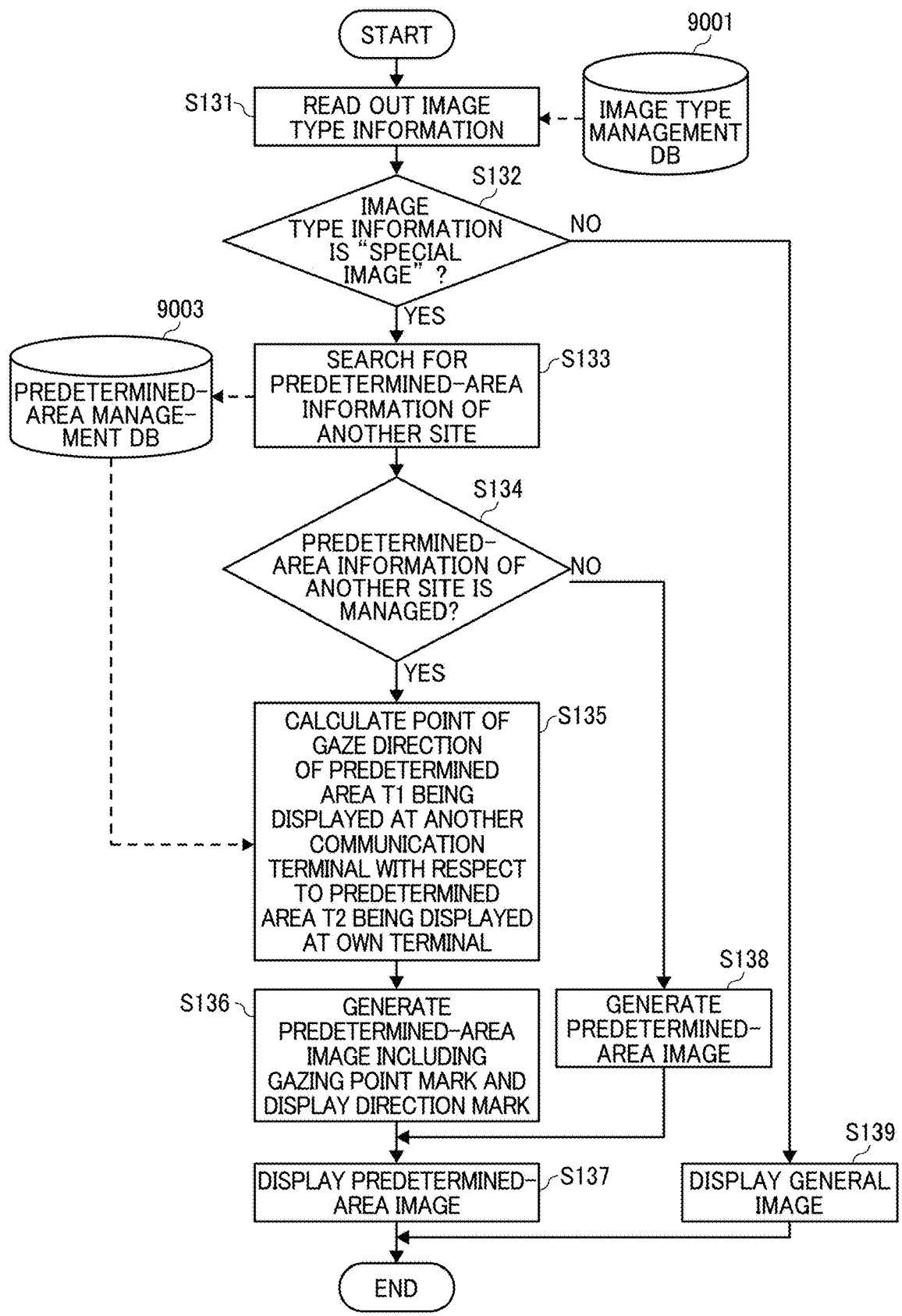
FIG. 29 is a flowchart illustrating an operation of displaying the predetermined-area image, according to an embodiment of the present disclosure.

Referring to FIG. 29 to FIG. 34, a description is given of using the predetermined-area information shared by the communication terminals in the different sites, according to the embodiment. FIG. 29 is a flowchart illustrating steps in an operation of displaying a predetermined-area image according to the embodiment. Since the same or the substantially the same operation is performed at each communication terminal, an operation performed by the smartphone 9 in the site B is described below. More specifically, a description is given of an operation performed by the smartphone 9 in the site B, when the videoconference terminal 3d in the site D displays a predetermined-area image based on captured-image data transmitted from the videoconference terminal 3a in the site A, and the videoconference terminal 3d transmits predetermined-area information indicating the predetermined-area image to other communication terminals participating in the same video calling.

First, the data storage/read unit 99 of the smartphone 9 searches the image type management DB 9001 (FIG. 16) using the image data ID received at S103 in the process illustrated in FIG. 26 as a search key, to read out the image type information (source name) associated with the image data ID (step S131).

Subsequently, the determination unit 95 determines whether the image type information read in step S131 indicates "special image" or not (S132). When the image type information read in step S131 indicates "special image" (S132: YES), the data storage/read unit 99 searches the predetermined-area management DB 9003 for predetermined-area information indicating a predetermined-area image being displayed by each of the communication terminals in the other sites (step S133). Next, the determination unit 95 determines whether the predetermined-area information indicating the predetermined-area image being displayed by the communication terminal in each of the other sites is managed in the predetermined-area management DB 9003 (step S134). When the predetermined-area information indicating the predetermined-area image being displayed by each of the communication terminals in the other sites is managed in the predetermined-area management DB 9003 (S134: YES), the calculation unit 97 calculates a position of a predetermined area T2 with respect to a predetermined area T1 in a whole image, based on predetermined-area information (i2) indicating the predetermined-area image of the predetermined area T2 displayed by the smartphone 9 (own terminal) and the predetermined-area information (i1) indicating the predetermined-area image of the predetermined area T1, which information (i1) is received by the data exchange unit 91 from the communication terminal in the different site and stored in the predetermined-area management DB 9003 (step S135). The position calculated in step S135 indicates, in a strict sense, a position of a point of gaze of the predetermined area T1 with respect to a point of gaze of the predetermined area T2. The point of gaze is the center point as described above. In another example, the point of gaze is an upper left corner (or a lower left corner, an upper right corner, or a lower right corner) of a rectangle of each of the predetermined areas. In still another example, the point of gaze is a specific point within each of the predetermined areas.

Figure 30A:
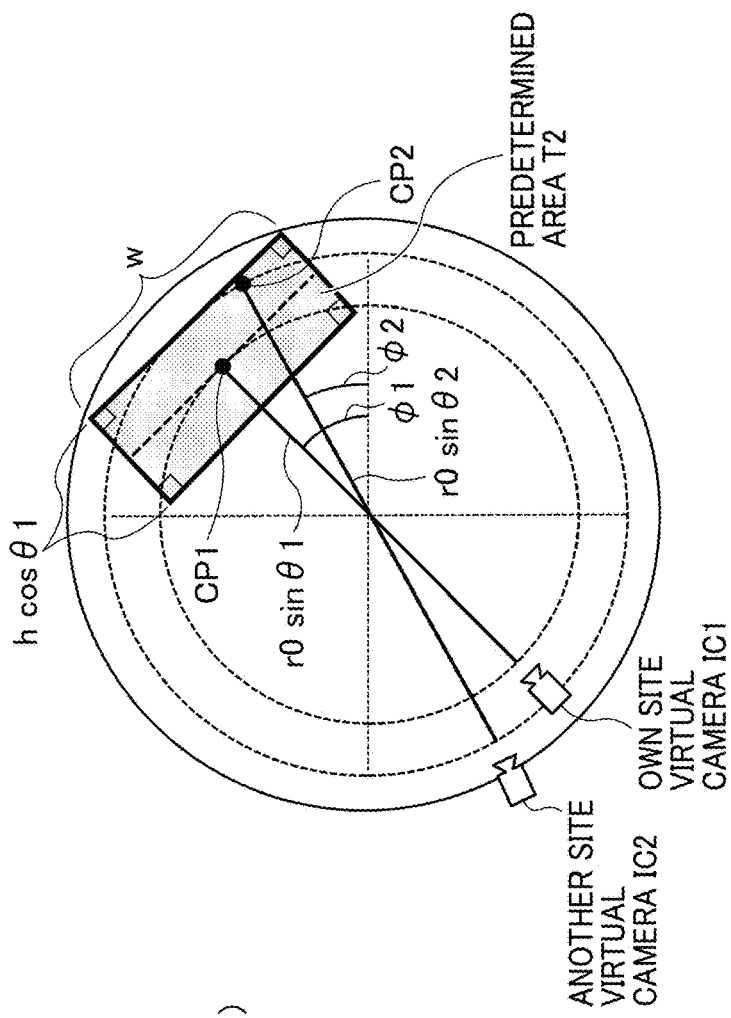
FIGS. 30A and 30B are illustrations for explaining how a position of a point of gaze of another site in a predetermined-area image of own site is determined, according to an embodiment of the present disclosure.
Figure 30B:
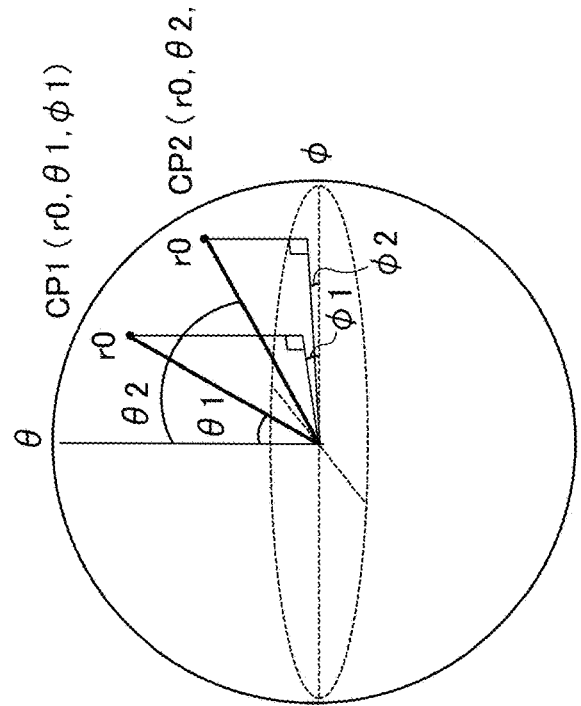

Referring to FIGS. 30A and 30B, a description is given of how the point of gaze of the predetermined area T1 with respect to the predetermined area T2 in the whole image is calculated. FIG. 30A is an illustration for explaining definitions of angles of the virtual camera. FIG. 30B is an illustration for explaining how the position of the point of gaze of one of the other site in the predetermined-area image of the own site is calculated by parallel projection viewed from above.

As illustrated in FIG. 30A, the calculation unit 97 acquires a moving radius r, a polar angle θ, and an azimuth angle φ from the predetermined-area information indicating the predetermined-area image being displayed by the display control unit 94 of the own terminal (smartphone 9), and sets the acquired information as CP1 (r0, θ1, φ1). Next, the calculation unit 97 acquires a moving radius r, a polar angle θ, and an azimuth angle φ from the predetermined-area information of one of the other site read out in the step S133, and set these information as CP 2 (r0, θ2, φ2).

Considering the predetermined area T2 being displayed by the own terminal (smartphone 9) and having its center at the point of gaze CP 1, a width w and a height h of the predetermined area T2 are projected respectively to w and a length of h cos θ1 in FIG. 30B obtained by parallel projection from the polar direction.

Further, the moving radius of the point of gaze CP 1 is projected to a length of r0 sin θ1, and the moving radius of the point of gaze CP2 is projected to a length of r0 sin θ2. Accordingly, the point of gaze CP1 is positioned at coordinates (r0 sin θ1·r0 cos φ1, r0 sin θ1·r0 sin φ1) and the point of gaze CP2 is positioned at coordinates (r0 sin θ2·r0 cos φ2, r0 sin θ2·r0 cos φ2).

As described above, since the coordinates of the point of gaze CP1 and the point of gaze CP2 are derived in FIG. 30B, the position of the point of gaze CP2 on a plane of the predetermined area T2 having the width w and the height h can be derived using general coordinate transformation.

Figure 31B:
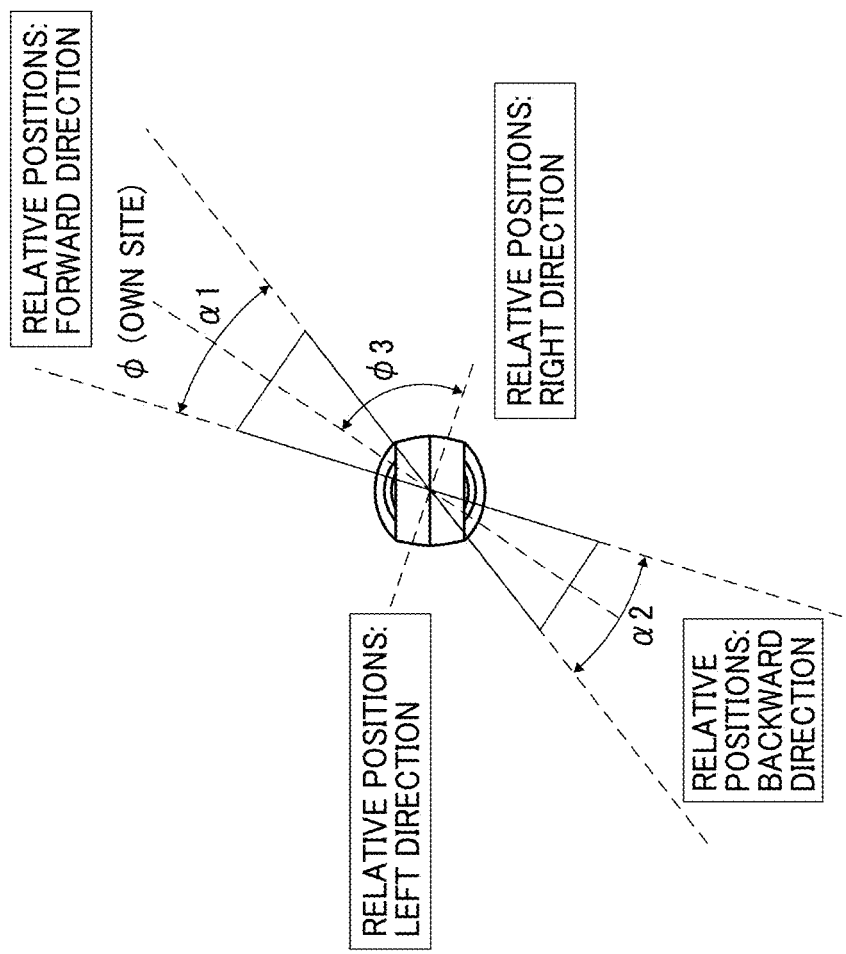
FIG. 31B is an illustration for explaining definitions of angle ranges, according to an embodiment of the present disclosure.
Figure 31A:
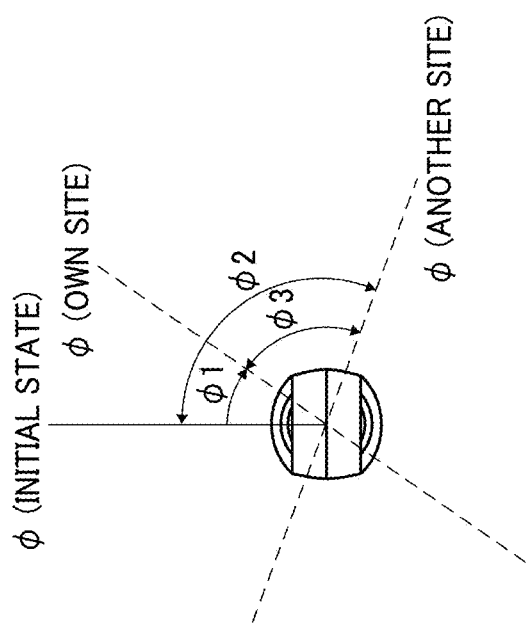
FIG. 31A is an illustration for explaining definition of angles, according to an embodiment of the present disclosure.

Referring to FIGS. 31A and 31B, a description is given of how the direction of the predetermined area T1 with respect to the predetermined area T2 in the whole image is calculated. FIG. 31A is an illustration for explaining definition of angles, according to the embodiment. FIG. 31B is an illustration for explaining definitions of angle ranges, according to the embodiment.

As illustrated in FIG. 31A, the calculation unit 97 acquires an azimuth angle φ from the predetermined-area information indicating the predetermined-area image being displayed by the display control unit 94 of the own terminal (smartphone 9), and sets this azimuth angle φ as a rotation angle φ1. Further, the calculation unit 97 acquires an azimuth angle φ from the predetermined-area information of the different site read out in step S133, and sets this azimuth angle φ as a rotation angle φ2. Furthermore, the calculation unit 97 calculates the difference between the rotation angle φ2 and the rotation angle φ1, and sets the calculated difference as a rotation angle φ3.

As illustrated in FIG. 31B, assuming that an angle range with its center on the rotation angle φ of the own site is a1, and an angle range with its center on an angle obtained by adding 180 degrees to a horizontal angle of the own site is α2, the calculation unit 97 calculates the direction of the predetermined area T1 with respect to the predetermined area T2 in the whole image, which may be referred to as a "positional relationship" as follows.

(1) When the rotation angle φ3 is included in the angle range α1, the positional relationship is determined as "forward direction".

(2) When φ3 is included in the angle range α2, the positional relationship is determined as "backward direction".

(3) When φ3 is included neither in the angle range al nor in the angle range α2, and is greater than 0 degree and less than 180 degrees, the positional relationship is determined as "rightward direction".

(4) When φ3 is included neither in the angle range al nor in the angle range α2, and is equal to or greater than 180 degrees and less than 360 degrees, the positional relationship is determined as "leftward direction".

Figure 32A:
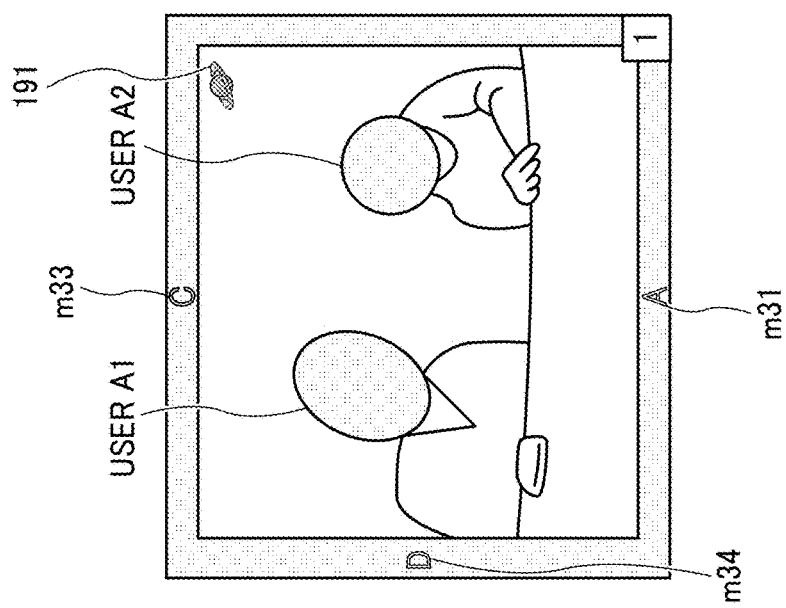
FIGS. 32A to 32C are views, each illustrating a display example of the predetermined-area image including display direction marks, which is displayed in a main display area, according to an embodiment of the present disclosure.
Figure 32B:
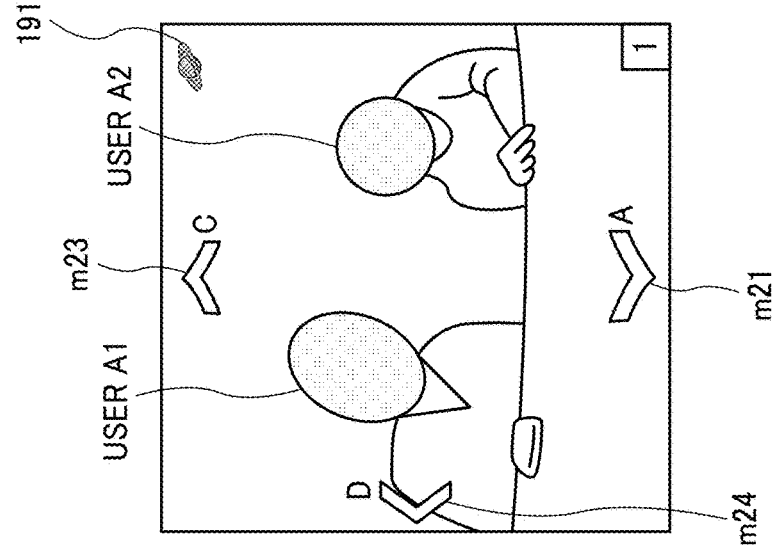
Figure 32C:
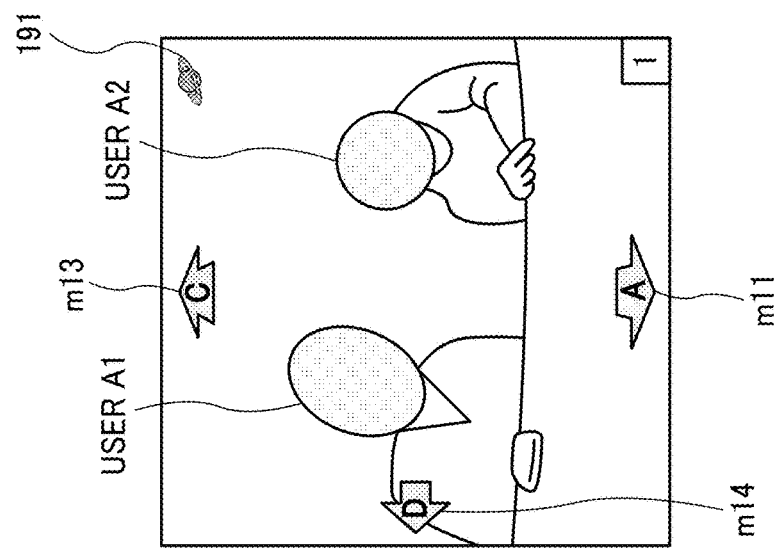
Figure 33A:
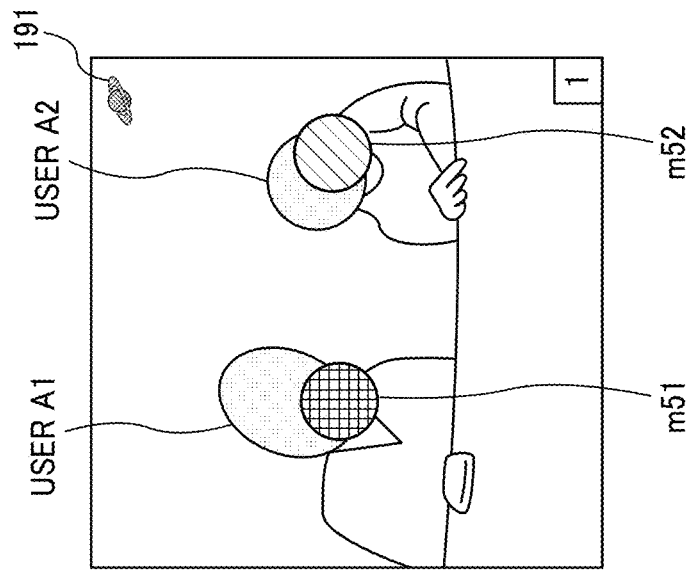
FIGS. 33A and 33B are views, each illustrating a display example of the predetermined-area image including gazing point marks, which is displayed in a main display area, according to an embodiment of the present disclosure.
Figure 33B:
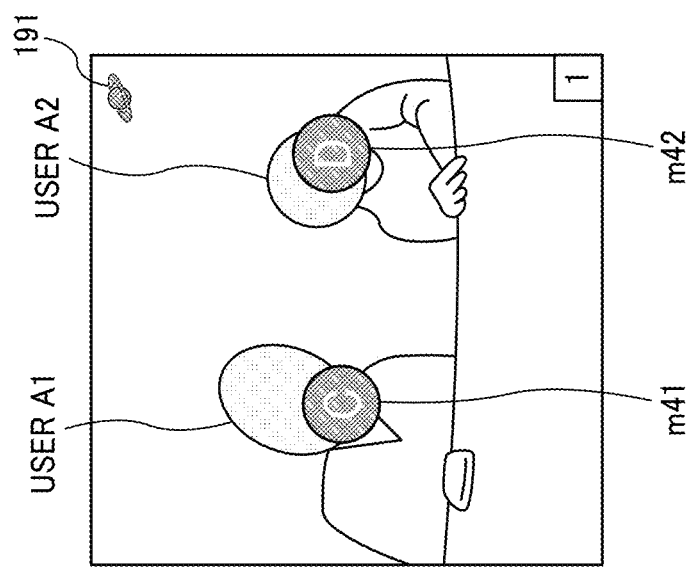
Figure 34:
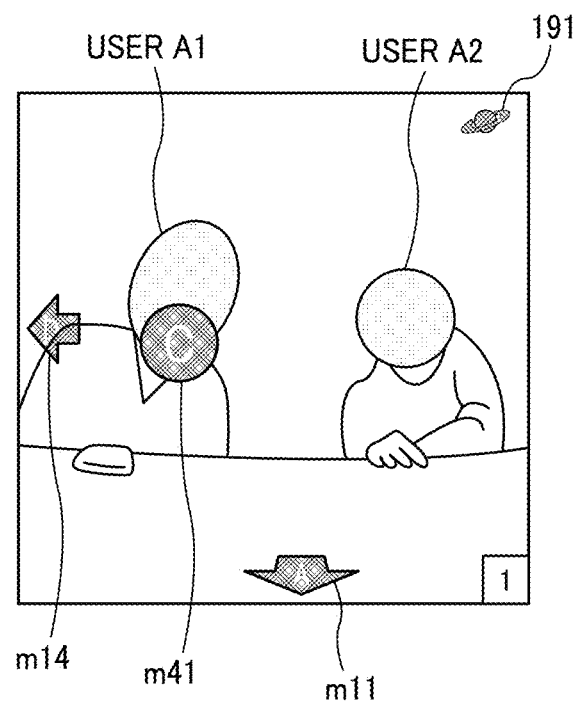
FIG. 34 is a view illustrating a display example of the predetermined-area image including the gazing point mark and the display direction marks, which is displayed in a main display area, according to an embodiment of the present disclosure.

Next, the image and audio processor 93 generates a predetermined-area image including a gazing point mark indicating the point of gaze and a display direction mark indicating the direction calculated by the calculation unit 97 (step S136). A display position of the gazing point mark is obtained directly from the position of the predetermined area T1 with respect to the predetermined area T2 in the whole image. A display position of the display direction mark is obtained by the determination processing of (1) to (4) described above using the position of the predetermined area T1 with respect to the predetermined area T2 in the whole image. At this step, based on the image type information indicating the "special image", the image and audio processor 93 combines each of the sphere icons 191 and 192 indicating a spherical panoramic image with each of the predetermined-area images. Then, as illustrated in FIGS. 32A, 32B and 32C, FIGS. 33A and 33B, and FIG. 34, the display control unit 94 displays the predetermined-area image generated in step S136 (step S137). FIGS. 32A, 32B and 32C are views, each illustrating a display example of the predetermined-area image including display direction marks, which image is displayed in the main display area. FIGS. 33A and 33B are views, each illustrating a display example of the predetermined-area image including gazing point marks, which image is displayed in the main display area. FIG. 34 is a view illustrating a display example of the predetermined-area image including display direction marks and a gazing point mark, which image is displayed in the main display area. Although in fact, as illustrated in FIG. 27, images of all sites where the communication terminals are participating in the video call are displayed, in FIGS. 32A, 32B and 32C, FIGS. 33A and 33B, and FIG. 34, only the image of the site A is illustrated in order to simplify the drawing.

As illustrated in FIG. 32A, in the predetermined-area image, which is a part of the image of the site A, display direction marks m11, m13, m14 are displayed, each indicating a direction of the predetermined-area image displayed by each of the communication terminals in the other sites with respect to the predetermined-area image being displayed by the smartphone 9 in the site B (own site) in the whole image. Display direction marks m21, m23, m24 illustrated in FIG. 32B correspond to the display direction marks m11, m13, m14 illustrated in FIG. 32A, respectively. Further, display direction marks m31, m33 and m34 illustrated in FIG. 32C also correspond to the display direction marks m11, m13, m14 illustrated in FIG. 32A, respectively. Each display direction mark is an example of direction information. The direction information can be represented in any other suitable form. In another example, the direction information is indicated by characters such "right", "left", "back" and "front" instead of by an arrow.

Further, as illustrated in FIG. 33A, in the predetermined-area image which is a part of the image of the site A, gazing point marks m41 and m42, each indicating the point of gaze of the predetermined-area image displayed in each of the other sites with respect to the predetermined-area image being displayed in the site B (own site) in the whole image, are displayed. The gazing point marks may be semi-transparent so as not to hide the predetermined-area image. Gazing point marks m51 and m52 illustrated in FIG. 33B correspond to the gazing point marks m41 and m42 illustrated in FIG. 33A, respectively.

In FIG. 33A, in order to enable the user B1 or B2 to identify which site's point of gaze is indicated by each of the displayed gazing point marks, the displayed gazing point mark m41 includes "C", which is a name of the site C, and the displayed gazing point mark m42 includes "D", which is a name of the site D. On the other hand, in FIG. 33B, although the site names are not displayed, patterns of the gazing point marks m51 and m52 are different from each other, thereby indicating different sites. In this case, if a table associating the patterns and the site names with each other is prepared, the user in each site can identify the site based on the pattern of the gazing point mark. For example, the table is printed on paper. In another example, the table is stored in each site as electronic data.

In addition, instead of the patterns, colors or line types can be used to distinguish the gazing point marks. The gazing point mark is an example of relative position information.

In FIG. 34, the gazing point mark m41 indicating the point of gaze of the other site (site C) which is within the predetermined-area image, is displayed. Further, in FIG. 34, the display direction marks m11 and 14 indicating the direction of the predetermined-area image displayed by each of the communication terminals in the other sites (site A and site D) are displayed, because the points of gaze of these sites are not within the predetermined-area image.

Referring again to FIG. 29, when the determination unit 95 determines that the predetermined-area information indicating the predetermined-area image displayed by the communication terminal in each of the other sites is not managed in the predetermined-area management DB 9003 (S134: NO), the image and audio processor 93 generates a predetermined-area image that does not include the gazing point mark and the display direction mark (step S138). Then, the operation proceeds to step S137.

Further, when the determination unit 95 determines that the image type information does not indicate "special image" (S132: NO), that is, when the image type information indicates "general image", the image and audio processor 93 does not generate a spherical panoramic image from the captured-image data received in step S103, and the display control unit 94 displays a general image (step S139).

As described above, the users B1 and B2 in the site B can recognize the relative positions between the predetermined-area image displayed in the own site and the predetermined-area image displayed at one or more of the other sites. This prevents the users B1 and B2 in the site B from being unable to keep up with discussion in a meeting, etc.

<<Effects of Embodiment>>

As described above, the communication terminal, such as the videoconference terminal 3a, according to the present embodiment, generates a spherical panoramic image and a predetermined-area image based on image type information associated with the image data ID transmitted with image data. This prevents the front-side hemispherical image and the back-side hemispherical image from being displayed as illustrated in FIG. 27A.

Further, a user in a given site can recognize which part of a whole image of the spherical panoramic image is displayed as the predetermined-area image in one or more of the other sites. For example, this makes it easier for the user to keep up with discussion in a meeting or the like as compared with a conventional art.

Further, in the operation illustrated in FIG. 28, if the communication management system 5 transfers predetermined-area information received from the videoconference terminal 3d to the other communication terminals, each time the communication management system 5 receives the predetermined-area information from the videoconference terminal 3d, the users B1 and B2 are prevented from concentrating on video calling due to flickering of the gazing point mark and the display direction marks illustrated in FIG. 34. To address this matter, as the processes in steps S112 to S114, the communication management system 5 transmits, at regular intervals, a set of the latest (the most recently stored) predetermined-area information and the IP addresses. This allows each user to concentrate on video calling.

Second Embodiment

Referring to FIG. 35, a second embodiment is described. FIG. 35 is a sequence diagram illustrating another example of an operation of sharing predetermined-area information described above referring to FIG. 28. In FIG. 35, the videoconference terminal 3a in the site A is an example of a communication terminal (own terminal), and the videoconference terminal 3d in the site D is an example of another communication terminal.

In the first embodiment, as illustrated n FIG. 28, the communication management system 5 once stores predetermined-area information transmitted from any one of the communication terminals (see step S112) and transmits predetermined-area information at regular intervals to each of the other communication terminals other than the communication terminal that transmits the predetermined-area information (see steps S114 to S119). By contrast, in the second embodiment, as illustrated in FIG. 35, not the communication management system 5 but any one of the communication terminals (the videoconference terminal 3a, in the embodiment) as a transmission source of captured-image data once stores predetermined-area information (see step S213), and transmits predetermined-area information to each of the communication terminals other than the own terminal (the videoconference terminal 3*a*) at regular intervals (see steps S215 to S221). In other words, according to the present embodiment, a communication terminal as a transmission source of captured-image data manages how a predetermined-area image representing the predetermined area T1 is displayed by another communication terminal based on the captured-image data transmitted from the own terminal (the videoconference terminal 3*a*, in the embodiment).

The system, hardware and functional configurations of the present embodiment are same or the substantially the same as those of the first embodiment. The difference between the present embodiment and the first embodiment is an operation illustrated in FIG. 28. Therefore, in the following, the operation different from the first embodiment is described referring to FIG. 35. The same reference numerals are given to the same or corresponding functions or configurations as those of the first embodiment, and redundant descriptions thereof are omitted or simplified appropriately.

First, when the user D1, D2 or D3 operates the videoconference terminal 3*d* in the site D to display a predetermined-area image of the site A, the data exchange unit 31*d* of the videoconference terminal 3*d* transmits, to the communication management system 5, predetermined-area information indicating the predetermined-area image currently being displayed (step S211). This predetermined-area information includes the IP address of the videoconference terminal 3*a*, which is a sender terminal of the captured-image data, and the IP address of the videoconference terminal 3*d*, which is a destination terminal of the captured-image data. In this example, the videoconference terminal 3*d* is also a sender terminal of the predetermined-area information. The communication management system 5 receives the predetermined-area information at the data exchange unit 51.

Next, the data exchange unit 51 of the communication management system 5 transmits the predetermined-area information including the IP addresses received in step S211 to the videoconference terminal 3*a*, which is a sender terminal of the captured-image data (step S212). The videoconference terminal 3*a* receives the predetermined-area information at the data exchange unit 31*a*.

Next, the data storage/read unit 39*a* of the videoconference terminal 3*a* stores, in the predetermined-area management DB 3003*a*, the predetermined-area information and the IP address of the sender terminal and the IP address of the destination terminal, which are received at step S212, in association with one another (step S213). The process of step S213 is a process of managing how the captured-image data transmitted from the own terminal (videoconference terminal 3*a*, in the embodiment) is displayed in another communication terminal. The processes in steps S211 to S213 are performed each time the predetermined-area image is changed in the videoconference terminal 3*d*.

The data storage/read unit 39*a* of the videoconference terminal 3*a* reads out, from a plurality of sets of the predetermined-area information and the IP address of each of the sender terminal and the destination terminal stored in the predetermined-area management DB 3003*a*, the latest (the most recently stored) set of predetermined-area information and the IP address of each of the sender terminal and the destination terminal, at regular intervals such as every thirty seconds (step S214). Then, the data exchange unit 31*a* transmits the predetermined-area information including the IP addresses read out in step S214 to the communication management system 5 (step S215). The communication management system 5 receives the predetermined-area information at the data exchange unit 51.

Next, the data exchange unit 51 of the communication management system 5 transmits (distributes) the predetermined-area information including the IP addresses received in step S215 to each of the communication terminals (videoconference terminal 3*d*, smartphone 9, PC 7) (steps S216, S218, S220). The videoconference terminal 3*d* receives the predetermined-area information at the data exchange unit 31*d*. The data storage/read unit 39*d* stores, in the predetermined-area management DB 3003*d*, the predetermined-area information received in step S216 in association with the IP addresses that are also received in step S216 (step S217). In substantially the same manner, the smartphone 9 receives the predetermined-area information at the data exchange unit 91. The data storage/read unit 99 stores, in the predetermined-area management DB 9003, the predetermined-area information received in step S218 in association with the IP addresses that are also received in step S218 (step S219). Further, PC 7 receives the predetermined-area information at the data exchange unit 71. The data storage/read unit 79 stores, in the predetermined-area management DB 7003, the predetermined-area information received in step S220 in association with the IP addresses that are also received in step S220 (step S221).

<<Effects of Embodiment>>

As described above, according to the present embodiment, a communication terminal as a transmission source of captured-image data collects predetermined-area information indicating how each communication terminal displays an image based on the captured-image data transmitted from the own terminal, and transmits the collected predetermined-area information to each communication terminal. Accordingly, in addition to the effects of the first embodiment, a burden is prevented from concentrating on the communication management system 5, in the case where a large number of communication terminals is participating in the same videoconference or the like.

Third Embodiment

Hereinafter, a description is given of a third embodiment.

Although in FIG. 10, the image capturing device 1*a* includes one microphone 108, in the present embodiment, the image capturing device 1*a* includes a plurality of directional microphones. By using the plurality of directional microphones by the image capturing device 1*a*, audio data collected by each of the directional microphones are transmitted from the image capturing device 1*a* to the videoconference terminal 3*a*. The calculation unit 37*a* of the videoconference terminal 3*a* calculates a direction of a sound source (microphone angle) based on the audio data collected by each of the directional microphones. The calculated direction is used for identifying a position of a speaker (of a transmission source of the captured image). The same applies to the image capturing device 1*b*. The image capturing device 1*b* including a plurality of directional microphone transmits audio data collected by each of the directional microphones to the smartphone 9. The calculation unit 97 of the smartphone 9 calculates a direction of a sound source (microphone angle) based on the audio data collected by each of the directional microphones. The calculated angle is used to identify a position of a speaker (of a transmission source of the captured image).

<<Effects of Embodiment>>

According to an aspect of the present disclosure, a user in a given site can recognize more accurately which part of a whole image of a spherical panoramic image is displayed as a predetermined-area image is displayed in one or more the other sites.

[Supplementary Information on Embodiment]

In the above embodiment, a description is given of an example in which the predetermined area T is specified by predetermined-area information indicating an imaging direction and an angle of view of the virtual camera IC in a three-dimensional virtual space containing the spherical image CE. However, the predetermined-area T can be specified any other suitable information. For example, in a case where the angle of view is kept constant, the predetermined area T may be specified by predetermined point information indicating the center point CP or an arbitrary point of four corners of the predetermined area T having a rectangular shape in FIG. 7. "Predetermined information" includes the predetermined-area information and the predetermined information.

In the above-described embodiments, a captured image (whole image) is a three-dimensional spherical panoramic image, as an example of a spherical image. In another example, the captured image is a two-dimensional panoramic image, as an example of a spherical image.

In addition, in this disclosure, the spherical image does not have to be a full-view spherical image. For example, the spherical image can be a wide-angle view image having an angle of about 180 to 360 degrees in the horizontal direction.

Further, In the above-described embodiments, the communication management system 5 transfers the predetermined-area information transmitted from each communication terminal. In another example, the communication terminals can directly exchange the predetermined-area information between one another.

Each of the functions of the above-described embodiments may be implemented by one or more processing circuits or circuitry. The processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. For example, some of the elements described in the above embodiments may be removed.

Any one of the above-described operations may be performed in various other ways, for example, in an order different from the one described above.

What is claimed is:

1. A communication terminal for displaying a predetermined-area image, which is an image of a part of a whole image, the communication terminal comprising:
   circuitry configured to:
   receive first predetermined information specifying a first predetermined area, the first predetermined information being transmitted from another communication terminal displaying a first predetermined-area image, which is an image of the first predetermined area in the whole image;
   calculate a position and a direction of the first predetermined area with respect to a second predetermined area in the whole image, based on the first predetermined information received and second predetermined information specifying the second predetermined area, the second predetermined area being an area of a second predetermined-area image being displayed by the communication terminal;
   generate the predetermined-area image including information on at least one of the calculated position and the calculated direction; and
   display the generated predetermined-area image.

2. The communication terminal of claim 1, wherein the circuitry is further configured to combine information indicating a spherical panoramic image with the whole image.

3. A method performed by a communication terminal for displaying a predetermined-area image, which is an image of a part of a whole image, the method comprising:
   receiving first predetermined information specifying a first predetermined area, the first predetermined information being transmitted from another communication terminal displaying a first predetermined-area image, which is an image of the first predetermined area in the whole image;
   calculating a position and a direction of the first predetermined area with respect to a second predetermined area in the whole image, based on the first predetermined information received and second predetermined information specifying the second predetermined area, the second predetermined area being an area of a second predetermined-area image being displayed by the communication terminal;
   generating the predetermined-area image including information on at least one of the calculated position and the calculated direction; and
   displaying the generated predetermined-area image.

4. The method of claim 3, further comprising:
   combining information indicating a spherical panoramic image with the whole image.

5. A communication terminal for displaying a predetermined-area image, which is an image of a part of a whole image, the communication terminal comprising:
   means for receiving first predetermined information specifying a first predetermined area, the first predetermined information being transmitted from another communication terminal displaying a first predetermined-area image, which is an image of the first predetermined area in the whole image;
   means for calculating a position and a direction of the first predetermined area with respect to a second predetermined area in the whole image, based on the first predetermined information received and second predetermined information specifying the second predetermined area, the second predetermined area being an area of a second predetermined-area image being displayed by the communication terminal;
   means for generating the predetermined-area image including information on at least one of the calculated position and the calculated direction; and
   a display to display the generated predetermined-area image.

6. The communication terminal of claim 5, further comprising:
   means for combining information indicating a spherical panoramic image with the whole image.

\* \* \* \* \*